(12) United States Patent
Harayama et al.

(10) Patent No.: US 11,270,518 B2
(45) Date of Patent: Mar. 8, 2022

(54) OBJECT SHAPING METHOD AND OBJECT SHAPING SYSTEM

(71) Applicant: MIMAKI ENGINEERING CO., LTD., Nagano (JP)

(72) Inventors: Kenji Harayama, Nagano (JP); Takeaki Kazaana, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 0 days.

(21) Appl. No.: 16/052,647

(22) Filed: Aug. 2, 2018

(65) Prior Publication Data

US 2019/0043268 A1 Feb. 7, 2019

(30) Foreign Application Priority Data

Aug. 3, 2017 (JP) .............................. JP2017-150690

(51) Int. Cl.
*G06T 19/20* (2011.01)
*G06T 15/08* (2011.01)
(Continued)

(52) U.S. Cl.
CPC ............ *G06T 19/20* (2013.01); *B29C 64/386* (2017.08); *B33Y 50/00* (2014.12); *B33Y 50/02* (2014.12);
(Continued)

(58) Field of Classification Search
CPC .. B29K 2995/0021; H04N 1/60; B33Y 50/00; B33Y 50/02; B29C 64/112;
(Continued)

(56) References Cited

U.S. PATENT DOCUMENTS

| 10,390,289 B2* | 8/2019 | Naqvi ................... H04W 48/10 |
| 2001/0005269 A1* | 6/2001 | Nozawa ................ G06F 3/1205 |
| | | 358/1.12 |

(Continued)

FOREIGN PATENT DOCUMENTS

| JP | 2015221515 | 12/2015 |
| JP | 2016016568 | 2/2016 |

(Continued)

OTHER PUBLICATIONS

"Search Report of Europe Counterpart Application", dated Jan. 7, 2019, p. 1-p. 9.

(Continued)

*Primary Examiner* — Phuc N Doan
(74) *Attorney, Agent, or Firm* — JCIPRNET

(57) ABSTRACT

An object shaping method is provided and includes: a data reading stage of reading a three-dimensional object data representing a three-dimensional object to be shaped, a slice data generating stage of generating a slice data representing a cross section of the three-dimensional object, and an object shaping stage of shaping the three-dimensional object in accordance with the slice data. In the slice data generating stage, pieces of slice data representing shapes and colors of the three-dimensional object at a plurality of different positions set in a layer-stacking direction are generated. A color adjustment process is executed at a time of generating the slice data associated with at least part of the plurality of different positions in the layer-stacking direction. The color adjustment process is a process for moderating variability of color appearance to the eye along an outer surface shape of the three-dimensional object shaped in the object shaping stage.

6 Claims, 21 Drawing Sheets

(51) Int. Cl.
*B33Y 50/02* (2015.01)
*B29C 64/386* (2017.01)
*B33Y 50/00* (2015.01)
*H04N 1/60* (2006.01)
*B29C 64/112* (2017.01)

(52) U.S. Cl.
CPC ............... *G06T 15/08* (2013.01); *H04N 1/60* (2013.01); *B29C 64/112* (2017.08); *B29K 2995/0021* (2013.01); *G06T 2219/2012* (2013.01); *G06T 2219/2016* (2013.01)

(58) Field of Classification Search
CPC ....... B29C 64/386; G06T 19/20; G06T 15/08; G06T 2219/2016; G06T 2219/2012
See application file for complete search history.

(56) References Cited

U.S. PATENT DOCUMENTS

| | | | |
|---|---|---|---|
| 2016/0339643 | A1 | 11/2016 | Dikovsky et al. |
| 2017/0136706 | A1 | 5/2017 | Hakkaku |
| 2018/0001546 | A1* | 1/2018 | Yamazaki .............. B33Y 50/02 |

FOREIGN PATENT DOCUMENTS

| | | | |
|---|---|---|---|
| JP | 2016150549 | | 8/2016 |
| JP | 2017087674 | | 5/2017 |
| WO | WO2015178443 | * | 11/2015 |
| WO | 2016132672 | | 8/2016 |

OTHER PUBLICATIONS

Office Action of Japan Counterpart Application, with English translation thereof, dated Feb. 2, 2021, pp. 1-5.

* cited by examiner

OBJECT SHAPING METHOD AND OBJECT SHAPING SYSTEM

CROSS REFERENCE TO RELATED APPLICATIONS

This application claims the priority benefit of Japanese Patent Application No. 2017-150690, filed on Aug. 3, 2017. The entirety of the above-mentioned patent application is hereby incorporated by reference herein and made a part of this specification.

TECHNICAL FIELD

This disclosure relates to an object shaping method and an object shaping system.

DESCRIPTION OF THE BACKGROUND ART

Conventionally, object shaping apparatuses that shape three-dimensional objects using inkjet heads (3D printers) (for example, Japanese Unexamined Patent Publication No. 2016-016568) are known. In such object shaping apparatuses, three-dimensional objects are shaped by layer lamination technique, in which a plurality of layers of inks ejected from inkjet heads are formed and stacked on one another.

Patent Literature 1: Japanese Unexamined Patent Publication No. 2016-016568

SUMMARY

To shape a three-dimensional object using an inkjet head, layers are formed with ink, which is the base material of the object, ejected to positions that are set in accordance with a resolution for object shaping (voxel positions). This may cause differences in level to be generated on the surface of the three-dimensional object correspondingly to distances to the voxel positions that depend on the object-shaping resolution.

Due to such differences in level, generally-called layer streaks may be conspicuous on the surface of the three-dimensional object. As a result, the three-dimensional object may be degraded in quality. This is, however, an inherent issue associated with the principle of operations to shape objects, which makes it difficult to rule out the possibility of such differences in level. Conventionally, it is desirable to minimize any adverse impacts from differences in level thus generated and obtain high-quality three-dimensional objects. The present disclosure provides an object shaping method and an object shaping system that may address the issues of the known art.

The inventors earnestly have studied adverse impacts from differences in level generated on the surfaces of three-dimensional objects. To be specific, the inventors have pursued to find out, through tests, how three-dimensional objects colored on their surfaces may be affected by differences in level. Their studies and tests demonstrate that, differences in level, if generated on the colored surface of a three-dimensional object, may be perceived as part of the object's shape and affect color appearance of the object to the eye.

The inventors have conducted further studies, which have led them to find out that color appearance to the eye may be less affected by controlling how to color the three-dimensional object in the vicinity of differences in level on its surface and that color adjustment may be feasible at the time of generating pieces of slice data representing cross sections of the three-dimensional object. The inventors have continued to study such effects and finally arrived at technical solutions to obtain these effects.

To address the issues of the known art, the present disclosure provides an object shaping method for shaping a three-dimensional object. The object shaping method includes: a data reading stage of reading a three-dimensional object data representing the three-dimensional object to be shaped by the object shaping method and at least designating a color used for coloration of at least part of a surface of the three-dimensional object; a slice data generating stage of generating a slice data representing a cross section of the three-dimensional object at each of a plurality of different positions in a layer-stacking direction previously set; and an object shaping stage of shaping the three-dimensional object in accordance with the slice data generated in the slice data generating stage. The slice data generating stage includes generating pieces of the slice data representing shapes and colors of the three-dimensional object at the plurality of different positions in the layer-stacking direction based on the three-dimensional object data in a manner that the pieces of slice data are associated with the plurality of different positions. The slice data generating stage further includes executing a color adjustment process at a time of generating the slice data associated with at least part of the plurality of different positions in the layer-stacking direction. The color adjustment process is a process of moderating variability of color appearance to an eye along an outer surface shape of the three-dimensional object shaped in the object shaping stage.

According to this configuration, color appearance to the eye may be appropriately adjusted in the three-dimensional object shaped in the object shaping stage. Further, variability of color appearance to the eye may be adequately suppressed in the three-dimensional object having differences in level on its surface. In the object shaping method thus configured, therefore, the operation to shape the three-dimensional object may be more suitably performed, and the three-dimensional object with a higher quality may be accordingly obtained.

In the slice data generating stage of the object shaping method thus configured, the slice data may be generated that represents the cross sections of the three-dimensional object at a resolution corresponding to a resolution set for object shaping in the object shaping stage. On the contour of a shape represented by the slice data, differences in level may be possibly generated by displaying the shape at a resolution corresponding to the object-shaping resolution. In that case, the object shaping method executes the color adjustment process. The contour of a shape represented by the slice data may be the contour of the three-dimensional object on its outer-surface side. The color adjustment process may moderate variability of color appearance to the eye at positions of at least part of the differences in level. By thus executing the color adjustment, variability of color appearance to the eye in the vicinity of differences in level may be adequately suppressed.

The color adjustment process may change the condition of the three-dimensional object in the vicinity of positions corresponding to at least part of the differences in level. In this instance, the vicinity of positions corresponding to differences in level may refer to a position(s) close enough to allow the color adjustment process to fulfill its purpose. Specifically, the slice data is adjusted so that a region lower in color density than the surrounding region is formed in a vicinity of positions corresponding to differences in level.

The region lower in color density than the surrounding region may be a region gradationally changed in color density. According to this configuration, variability of color appearance to the eye in the vicinity of differences in level may be more adequately suppressed.

In the object shaping stage of the method thus configured, the three-dimensional object may be shaped at a preset resolution for object shaping. In terms of features of the three-dimensional object shaped in the object shaping stage, the object is shaped as a result of the color adjustment process so that a region lower in color density is formed in the vicinity of differences in level. Specifically, in a case where the three-dimensional object has differences in level on its outer surface that result from a resolution set for object shaping, the three-dimensional object is shaped in the object shaping stage, so that a region lower in color density than the surrounding region is formed in the vicinity of at least part of differences in level. By thus executing the color adjustment, variability of color appearance to the eye in the vicinity of differences in level may be adequately suppressed.

In the object shaping stage, layers of a material for object shaping may be formed with the use of an ejection head that ejects the material for object shaping and then stacked on one another so as to shape the three-dimensional object. In this instance, the slice data associated with a respective one of the layers formed in the object shaping stage may be generated in the slice data generating stage. According to this configuration, the operation to shape the three-dimensional object may be suitably performed.

The three-dimensional object shaped in the object shaping stage may include a colored region and a light-reflective region. The colored region may be a region formed with a coloring material in a portion of the three-dimensional object where coloration is visually perceivable when observed from the outside of the object. The light-reflective region may be a region formed with a light-reflective material on the inner side than the colored region. In the color adjustment process, the colored region may be divided into an inner region, a middle region, and an outer region, and color adjustment may be applied to a respective one of these divided regions. The inner region may be a region including an interface between the colored region and the light-reflective region. The middle region may be a region on the outer side than the inner region that does not include an interface on the outer side of the three-dimensional object. The outer region may be a region on the outer side than the middle region that includes an interface on the outer side of the colored region. In this instance, the color adjustment process may be configured to apply color adjustment along the outer surface shapes of the inner region and the outer region. According to this configuration, colors may be appropriately adjusted in the color adjustment process.

Optionally, the color adjustment process may be executed upon receiving an instruction from a user. In this instance, the object shaping method may further include an instruction receiving stage of receiving from the user an instruction to execute the color adjustment process or an instruction not to execute the color adjustment process. When the instruction not to execute the color adjustment process is received from the user in the instruction receiving stage, the slice data is generated without the color adjustment process being executed in the slice data generating stage. When the instruction to execute the color adjustment process is received from the user in the instruction receiving stage, the slice data is generated with the color adjustment process being executed in the slice data generating stage. As a result, the slice data may be generated in a manner that variability of color appearance to the eye is moderated along the outer surface shape of the three-dimensional object, as compared with the slice data generated without the color adjustment process being executed. According to this configuration, the color adjustment process may be only executed as the need arises, and a three-dimensional object with a quality that satisfies the user's needs may be more suitably shaped and obtained.

The object shaping method may be rephrased as a three-dimensional object manufacturing method. The scope of the present disclosure may include use of an object shaping system configured likewise. Such a system may successfully enable similar effects.

As disclosed herein, the operation to shape the three-dimensional object may be more suitably performed, and the three-dimensional object with a higher quality may be accordingly obtained.

BRIEF DESCRIPTION OF THE DRAWINGS

FIG. 1A is a drawing that illustrates exemplified structural elements of the object shaping system 10. FIG. 1B is a drawing that illustrates exemplified principal structural elements of an object shaping apparatus 12. FIG. 1C is a drawing that illustrates exemplified structural elements of a head unit 102.

FIG. 2A is a drawing that illustrates an exemplified structural feature of the three-dimensional object 50. FIGS. 2B and 2C are drawings that illustrate possible factors that cause variability of color appearance to the eye.

FIG. 3A is a drawing of part of one ink layer. FIG. 3B is a schematic drawing of a plurality of ink layers being stacked on one another.

FIG. 4A is a drawing that illustrates the object shaping result. FIGS. 4B and 4C are drawings that illustrate manners of forming color adjustment regions 162 and 164 according to modified embodiments.

FIG. 10A is a drawing that illustrates an exemplified object shaping result obtained without an anti-aliasing process being executed.

FIG. 10B is a drawing that illustrates an exemplified object shaping result obtained with the anti-aliasing process being executed.

FIG. 11A is a drawing that illustrates angles of planes to be observed of the three-dimensional object 50. FIG. 11B is a photograph showing the object shaping result.

FIG. 12A is a drawing that illustrates exemplified cross sections of a three-dimensional object shaped without the anti-aliasing process being executed. FIG. 12B is a drawing that illustrates exemplified cross sections of a three-dimensional object as a result of the anti-aliasing process.

DESCRIPTION OF EMBODIMENTS

Figure 1A:
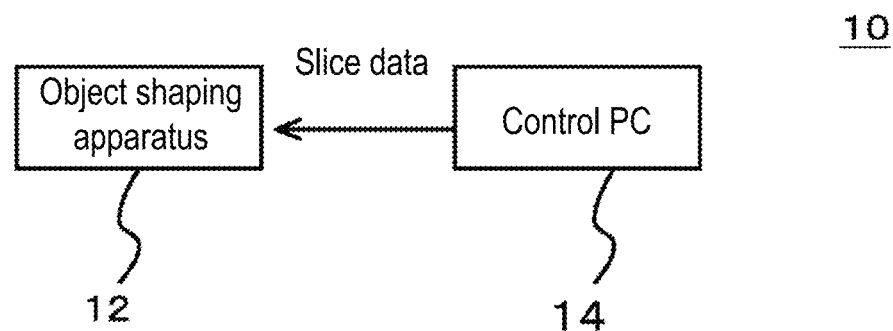
FIGS. 1A to 1C are drawings that illustrate an object shaping system 10 according to an embodiment of the present disclosure.
Figure 1B:
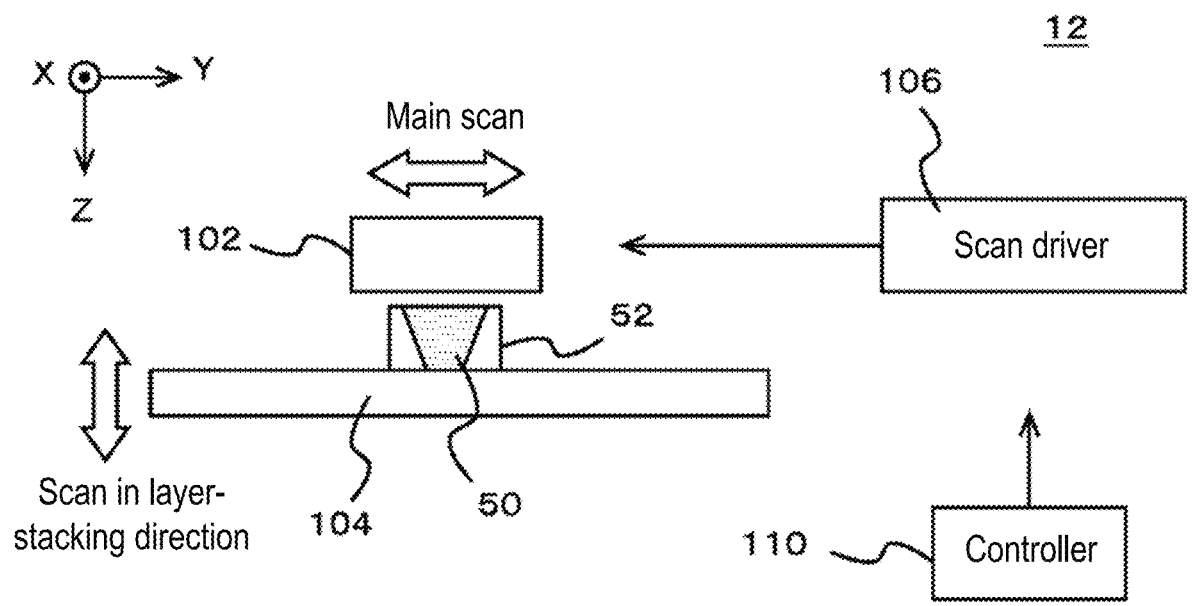
Figure 1C:
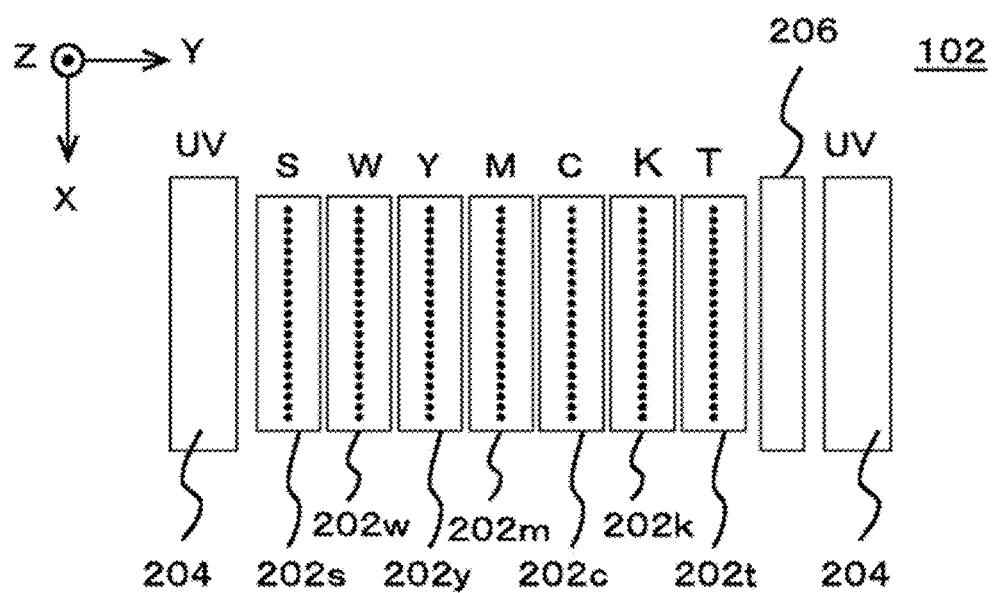

Embodiments of the present disclosure are hereinafter described referring to the accompanying drawings. FIGS. 1A to 1C are drawings that illustrate an object shaping system 10 according to an embodiment of the present disclosure. FIG. 1A is a drawing that illustrates exemplified structural elements of the object shaping system 10. In the illustrated example, the object shaping system 10 is for use in shaping a three-dimensional object. This system is equipped with an object shaping apparatus 12 and a control PC 14.

The object shaping apparatus 12 carries out an operation to shape a three-dimensional object. This apparatus shapes a three-dimensional object at a preset solution for object shaping, as prompted by the control PC 14. The object shaping apparatus 12 is more specifically a full-color object shaping apparatus operable to shape a three-dimensional object in full colors. The object shaping apparatus 12 receives data representing a three-dimensional object to be shaped from the control PC 14 and shapes the three-dimensional object based on the received data. In this embodiment, the object shaping apparatus 12 receives, as the data representing a three-dimensional object to be shaped, slice data representing cross sections of the three-dimensional object (slice image data), and then shapes the three-dimensional object based on the received slice data. The object shaping operation by the object shaping apparatus 12 is an exemplified operation in the object shaping stage. The operation in the object shaping stage is, for example, an operation in which the three-dimensional object is shaped by the object shaping apparatus 12 based on the generated slice data.

The control PC 14 is a computer (host PC) that controls the operation of the object shaping apparatus 12. The control PC 14 receives from an external source three-dimensional object data (layout data) that is 3D model data representing a three-dimensional object to be shaped, and then generates the slice data based on the received three-dimensional object data. The three-dimensional object data used then may be data representing a three-dimensional object in a format independent of, for example, type and model of the object shaping apparatus 12. An example of the three-dimensional object data may be 3D data for versatile uses. In this embodiment, the three-dimensional object data may be data designating a color(s) used for coloration of at least part of the surface of the three-dimensional object.

As described earlier, the slice data generated by the control PC 14 based on the three-dimensional object data represents cross sections of the three-dimensional object. In this embodiment, the control PC 14 generates the slice data representing a cross section of the three-dimensional object at each of different positions in a preset layer-stacking direction. The layer-stacking direction is a direction in which a material for object shaping is applied and stacked in layers when the object is shaped by the object shaping apparatus 12. Generating the slice data representing a cross section of the three-dimensional object at each of different positions may literally mean generating pieces of slice data corresponding to each cross section. The control PC 14 may generate pieces of slice data representing shapes and colors of the three-dimensional object at different positions set in the layer-stacking direction in a manner that the pieces of slice data are associated with these positions. The control PC 14 supplies the generated slice data to the object shaping apparatus 12 so as to control the operation to shape the object carried out by the object shaping apparatus 12.

In this embodiment, the control PC 14 is an example of slice data generating apparatuses (slicers). The reception of the three-dimensional object data from an external source by the control PC 14 is an example of the operation to read the three-dimensional object data in the data reading stage. The operation to generate the slice data based on the three-dimensional object data is an example of the operation in the slice data generating stage. The control PC 14 executes a predetermined color adjustment process at the time of generating pieces of slice data corresponding to at least part of the different positions in the layer-stacking direction. The color adjustment process will be described later in further detail.

As mentioned earlier, the object shaping system 10 in this embodiment has a plurality of apparatuses; the object shaping apparatus 12, and the control PC 14. In a modified embodiment, the object shaping system 10 may consist of a single apparatus. In this instance, a single object shaping apparatus 12 including functional features of the control PC 14 may constitute the object shaping system 10.

Hereinafter, specifics of the object shaping apparatus 12 are hereinafter described. FIG. 1B is a drawing that illustrates exemplified principal structural elements of the object shaping apparatus 12. In this embodiment, the object shaping apparatus 12 shapes a three-dimensional object 50 and includes a head unit 102, an object-shaping table 104, a scan driver 106, and a controller 110.

Except for the technical features described below, the object shaping apparatus 12 may be configured similarly or identically to the known object shaping apparatuses. More specifically, the object shaping apparatus 12, except for the technical features described below, may be configured similarly or identically to any known object shaping apparatuses configured to shape the three-dimensional object 50 by ejecting droplets of the material using inkjet heads. The object shaping apparatus 12 may further include any structural elements necessary for shaping the three-dimensional object 50 other than those illustrated in the drawing. In this embodiment, the object shaping apparatus 12 is an apparatus that shapes the three-dimensional object 50 by layer lamination technique (3D printer). The layer lamination technique shapes the three-dimensional object 50 by stacking a plurality of layers on one another.

The head unit 102 ejects the material of the three-dimensional object 50. In this embodiment, the material of the three-dimensional object 50 is ink. The ink described herein may be a functional liquid. In this embodiment, the ink may be rephrased as a liquid ejected from an inkjet head. Specifically, the head unit 102 ejects inks curable under predetermined conditions from a plurality of inkjet heads as the material of the three-dimensional object 50. Layers of the object material are formed by curing the ejected inks that have landed at target positions, and the layers thus formed are stacked on one another so as to shape the three-dimensional object. The inks used in this embodiment are ultraviolet-curable inks (UV inks) in liquid state that are cured by ultraviolet irradiation.

The head unit 102 ejects the material of support layers 52 in addition to the material of the three-dimensional object 50 so as to form the support layers 52 around the three-dimensional object 50 as needed. The support layers 52 constitute a multi-layered structure that surrounds the three-dimensional object 50 currently shaped and thereby supports the three-dimensional object 50. The support layers 52 are formed, if necessary, during the operation to shape the three-dimensional object 50 and are removed after the operation is over.

The object-shaping table 104 is a member in the form of a table that supports the three-dimensional object 50 currently shaped. The object-shaping table 104 is disposed at a position so as to face the inkjet heads of the head unit 102. On the upper surface of the object-shaping table 104 is placed the three-dimensional object 50 currently shaped. In this embodiment, the object-shaping table 104 is configured to allow at least its upper surface to move in the layer-stacking direction (Z direction in the drawing). The object-shaping table 104 is driven to move at least its upper surface by the scan driver 106 as the operation to shape the three-dimensional object 50 proceeds. In this embodiment, the layer-stacking direction is a direction orthogonal to a main scanning direction (Y direction in the drawing) and a sub scanning direction (X direction in the drawing).

The scan driver 106 drives the head unit 102 to perform scans in which the head unit 102 moves relative to the three-dimensional object 50 currently shaped. The movement relative to the three-dimensional object 50 currently shaped may be rephrased as movement relative to the object-shaping table 104. Driving the head unit 102 to perform scans may literally means driving the inkjet heads of the head unit 102 to perform scans. In this embodiment, the scan driver 106 drives the head unit 102 to perform main scans (Y scans), sub scans (X scans), and scans in the layer-stacking direction (Z scans).

The main scan may refer to an operation in which the head unit 102 ejects the inks while moving in the main scanning direction relative to the three-dimensional object 50 currently shaped. In this embodiment, the scan driver 106 drives the head unit 102 to perform main scans by moving the head unit 102, with the position of the object-shaping table 104 being fixed in the main scanning direction. The scan driver 106 may move the three-dimensional object 50 by driving the object-shaping table 104 to move, with the position of the head unit 102 being fixed in the main scanning direction.

The sub scan may refer to an operation in which the head unit 102 moves in the sub scanning direction orthogonal to the main scanning direction relative to the three-dimensional object 50 currently shaped. More specifically, the sub scan may be relative movement of the head unit 102 by a predetermined rate of feed to the object-shaping table 104 in the sub scanning direction. In this embodiment, the scan driver 106 drives the head unit 102 to perform sub scans at intervals between main scans by moving the object-shaping table 104, with the position of the head unit 102 being fixed in the sub scanning direction. In this embodiment, the scan driver 106 may drive the head unit 102 to perform sub scans by moving the head unit 102, with the position of the object-shaping table 104 being fixed in the sub scanning direction.

The scan in the layer-stacking direction may refer to an operation in which the head unit 102 moves in the layer-stacking direction relative to the three-dimensional object 50 currently shaped. The scan driver 106 drives the head unit 102 to perform scans in the layer-stacking direction as the object-shaping operation proceeds so as to adjust the positions of the inkjet heads in the layer-stacking direction relative to the three-dimensional object 50 currently shaped. More specifically, in this embodiment, the scan driver 106 drives the object-shaping table 104 to move in the layer-stacking direction, with the position of the head unit 102 being fixed in the layer-stacking direction. The scan driver 106 may move the head unit 102, with the position of the object-shaping table 104 being fixed in the layer-stacking direction.

The controller 110 may be the CPU of the object shaping apparatus 12. The controller 110 controls the operations of the respective structural elements in the object shaping apparatus 12 and thereby controls the operation to shape the three-dimensional object 50. In this embodiment, the controller 110 controls the respective structural elements in the object shaping apparatus 12 based on slice data received from the control PC 14. According to this embodiment thus characterized, the three-dimensional object 50 may be suitably shaped.

Structural elements of the head unit 102 of the object shaping apparatus 12 are hereinafter described in further detail. FIG. 1C is a drawing that illustrates exemplified structural elements of the head unit 102. In this embodiment, the head unit 102 includes a plurality of inkjet heads, a plurality of ultraviolet light sources 204, and a flattening roller 206. As illustrated in the drawing, the plurality of inkjet heads are an inkjet head 202s, an inkjet head 202w, an inkjet head 202y, an inkjet head 202m, an inkjet head 202c, an inkjet head 202k, and an inkjet head 202t. These inkjet heads are each an example of the ejection head that ejects the material for object shaping and may be arranged in the main scanning direction, with their positions being aligned with one another in the sub scanning direction. The inkjet heads each have a nozzle array on a surface thereof facing the object-shaping table 104. In the nozzle array are aligned a plurality of nozzles in a predetermined nozzle-array direction. In this embodiment, the nozzle-array direction is parallel to the sub scanning direction.

Of these inkjet heads, the inkjet head 202s ejects the material of the support layers 52 (support material). The material used to form the support layers 52 may be a suitable one selected from the known materials for such support layers.

The inkjet head 202w ejects a white color (W color) ink. The white color ink is an example of light-reflective inks and is used to form, for example, a region having light-reflective properties (light-reflective region) in the three-dimensional object 50. The inkjet head 202w is an example of heads that eject light-reflective materials. In this embodiment, the white color ink is also used to form the interior region of the three-dimensional object 50. The interior region of the three-dimensional object 50 may be a region on the inner side that does not affect the outer appearance of the three-dimensional object 50.

The ink used to form the interior region of the three-dimensional object 50 is not necessarily limited to the white color ink and may be optionally selected from other color inks. For example, an ink exclusively used to form the interior region (modeling ink) may be further used.

The inkjet heads 202y, 202m, 202c, and 202k (hereinafter, inkjet heads 202y-k) are inkjet heads for coloration for use in shaping the colored three-dimensional object 50. Specifically, the inkjet head 202y ejects a yellow color (Y color) ink. The inkjet head 202m ejects a magenta color (M color) ink. The inkjet head 202c ejects a cyan color (C color) ink. The inkjet head 202k ejects a black color (K color) ink. In this embodiment, these YMCK colors are each an example of process colors for full color expression by subtractive color mixture. The YMCK color inks are each an example of color materials used for coloration. The inkjet heads 202y-k are each an example of heads that eject coloring materials having different colors.

The inkjet head 202t ejects a clear ink. The clear ink may be a colorless, transparent (T) ink. In this embodiment, the clear ink is an example of uncolored clear materials having translucency. The inkjet head 202t is an example of heads that eject clear materials.

The ultraviolet light sources 204 are light sources used to cure the inks (UV light source). These light sources radiate ultraviolet light to cure ultraviolet-curable inks. The ultraviolet light sources 204 are respectively disposed on one end side and the other end side of the head unit 102 in the main scanning direction, and the inkjet heads are interposed between these light sources. A suitable example of the ultraviolet light source 204 may be UVLED (ultraviolet LED). Other possible examples of the ultraviolet light source 204 may include a metal halide lamp and a mercury lamp.

The flattening roller 206 is a means that flattens the ink layers formed during the operation to shape the three-dimensional object 50. During the main scans, for example, the flattening roller 206 flattens the ink layers by making contact with the surface of each ink layer and removing part of the ink yet still uncured.

The head unit 102 thus configured may allow the ink layers constituting the three-dimensional object 50 to be suitably formed, and the three-dimensional object 50 may be suitably shaped by stacking the ink layers thus formed on one another.

Specific features of the head unit 102 are not necessarily limited to those described so far and may be optionally modified in various manners. The head unit 102 may further have an inkjet head(s) for any color(s) other than the colors described so far. Further, the inkjet heads of the head unit 102 may be arranged otherwise in variously different manners. For example, positions of some of the inkjet heads may be displaced from positions of the other inkjet heads in the sub scanning direction.

Figure 2A:
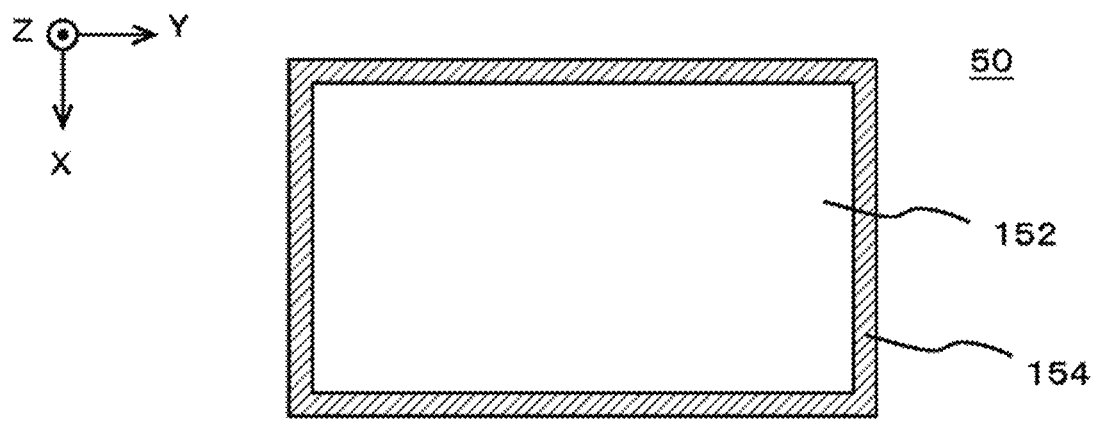
FIGS. 2A to 2C are drawings that illustrate a three-dimensional object 50 shaped by the object shaping apparatus 12 according to the embodiment.
Figure 2B:
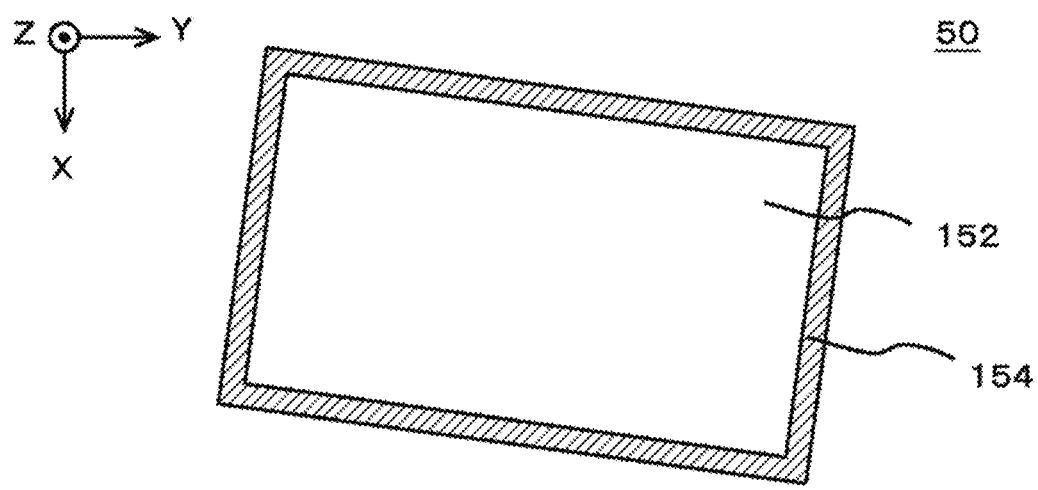
Figure 2C:
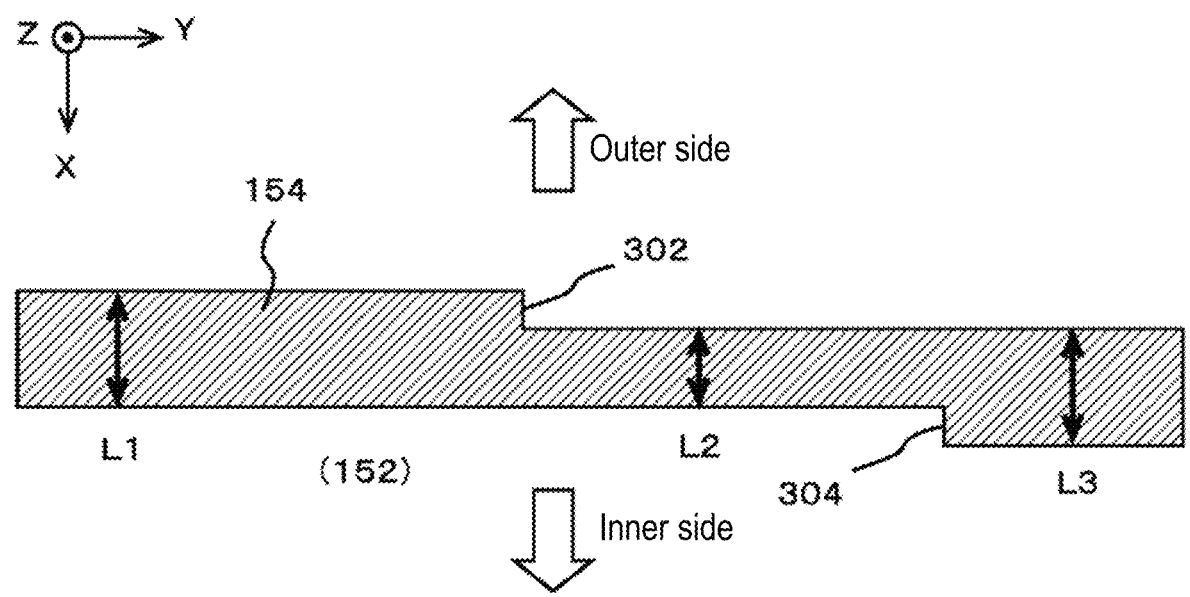

Next, the three-dimensional object 50 shaped by the object shaping apparatus 12 according to this embodiment is hereinafter described in further detail. FIGS. 2A to 2C are drawings that illustrate the three-dimensional object 50 shaped by the object shaping apparatus 12 according to this embodiment. FIG. 2A is a drawing of an exemplified structural feature of the three-dimensional object 50, illustrating the three-dimensional object 50 in X-Y cross section orthogonal to the layer-stacking direction (Z direction). The three-dimensional object 50 is similarly structured in Z-X cross section and Z-Y cross section perpendicular to the Y direction and the Z direction.

As described earlier, the object shaping apparatus 12 in this embodiment may shape the colored three-dimensional object 50 using the inkjet heads 202y-k. The three-dimensional object 50 obtained then is a three-dimensional object 50 at least colored on its surface. To color the three-dimensional object 50 on its surface means to color at least part of a region where coloration is visually perceivable when observed from the outside of the three-dimensional object 50. As illustrated in the drawing, the object shaping apparatus 12 may shape the three-dimensional object 50 including a light-reflective region 152 and a colored region 154.

The light-reflective region 152 is a region formed with the light-reflective material; white color ink, on the inner side than the colored region 154. In this embodiment, the light-reflective region 152 is also the interior region of the three-dimensional object 50.

The colored region 154 is a region colored with the coloring inks ejected from the inkjet heads 202y-k. The colored region 154 may be a region formed with the coloring material in a portion of the three-dimensional object where coloration is visually perceivable when observed from the outside. In this embodiment, the object shaping apparatus 12 forms the colored region 154 around the light-reflective region 152 using the coloring inks ejected from the inkjet heads 202y-k and the clear ink ejected from the inkjet head 202t. To form the colored region 154, various colors may be produced by adjusting the amounts of the coloring inks of different colors ejected to preset positions. The clear ink is used so that the amounts of the coloring inks variable with colors to be produced (0% to 100% per unit area) are constantly 100%. Thus, desired coloration using any desired colors may be feasible at different positions in the colored region 154. As a result, the three-dimensional object 50 colored on its outer surface may be suitably formed.

In a modified embodiment, the three-dimensional object 50 may have technical aspects that differ from those described so far. For example, the three-dimensional object 50 may have additional region(s) other than the described regions. A possible example of the additional region(s) may be a protective region formed with the clear ink on the outer side than the colored region 154. The protective region may be a transparent region formed to protect the outer surface of the three-dimensional object 50. Another possible example may be a dividing region formed with the clear ink between the light-reflective region 152 and the colored region 154. The dividing region may be a transparent region formed to prevent mixing between the white color ink for the light-reflective region 152 and the inks for the colored region 154. For example, the interior region of the three-dimensional object 50 may be a region formed with any ink but the white color ink apart from the light-reflective region 152.

Next, color appearance to the eye of the colored region 154 in the three-dimensional object 50 is described. In this embodiment, the colored region 154 is formed with the YMCK color inks to produce various colors at different positions in the colored region 154, as described earlier. In the three-dimensional object 50 actually obtained, color appearance to the eye may be affected and changed by subtle structural differences generated during the object-shaping operation. Depending on the shape of the three-dimensional object 50 or position of the three-dimensional object 50 during the object-shaping operation, for example, the surface of the three-dimensional object 50 may be horizontally or vertically inclined. In such an event, the inclination may affect and change color appearance to the eye.

FIGS. 2B and 2C are drawings that illustrate possible factors that cause variability of color appearance to the eye. FIG. 2B is a drawing that illustrates the three-dimensional object 50 in cross section along a plane orthogonal to the layer-stacking direction. The three-dimensional object 50 illustrated in FIG. 2B has the same shape as the three-dimensional object 50 illustrated in FIG. 2A. In FIG. 2B, the three-dimensional object 50 is changed in position so as to slightly incline relative to the main scanning direction (Y direction). The direction of the three-dimensional object 50 illustrated in FIG. 2B may be a direction after the three-dimensional object 50 illustrated in FIG. 2A is rotated by an angle smaller than 90 degrees relative to an axis parallel to the layer-stacking direction.

In the example illustrated in FIG. 2A, the contour of the three-dimensional object 50 in cross section is defined by straight lines parallel to the main scanning direction and the sub scanning direction. On the other hand, the contour of the three-dimensional object 50 in cross section illustrated in FIG. 2B is defined by straight lines not parallel to the main scanning direction and the sub scanning direction. The three-dimensional object 50 illustrated in FIG. 2B has an outer surface (outer peripheral surface) with fine differences in level on its edge as a result of the object-shaping operation by the object shaping apparatus 12 (see FIGS. 1A to 1C).

FIG. 2C is an enlarged view of the colored region 154, schematically illustrating an exemplified structure in part of the three-dimensional object 50 illustrated in FIG. 2B. Specifically, FIG. 2C a schematic drawing of an exemplified structure of the three-dimensional object 50 illustrated in FIG. 2B when slice data is generated without the color adjustment process described later in detail. In this embodiment, the object shaping apparatus 12 shapes the three-dimensional object 50 in accordance with slice data received from the control PC 14 (see FIGS. 1A to 1C), as described earlier. The slice data represents shapes of the three-dimensional object 50 in cross section at a resolution corresponding to a resolution set for object shaping in the object shaping apparatus 12.

In this embodiment, a piece of slice data corresponding to a position in cross section may be regarded as a two-dimensional image representing a shape and a color at the position in cross section. This two-dimensional image consists of a plurality of pixels arranged in the main scanning direction (Y direction) and the sub scanning direction (X direction). In this instance, a phenomenon, like jaggy, may possibly appear in the slice data in the same manner as or similarly to the two-dimensional image expressed at a predetermined resolution. The jaggy may refer to an event likely to occur in bitmapped images. As a result, differences in level equivalent to the jaggy may be generated in the three-dimensional object 50 shaped by the object shaping apparatus 12 in accordance with the slice data.

In a case where the contour of the three-dimensional object 50 is at least partly inclined in the main scanning direction, as seen in the contour in cross section illustrated in FIG. 2B, inclined portions on the inner and outer sides of the colored region 154 in a magnified view are not obliquely straight but are stepwise due to differences in level generated at intervals depending on the degree of inclination, as illustrated in FIG. 2C. Specifically, in the colored region 154 of example illustrated in FIG. 2C, a stepwise portion with a difference in level 302 is on the outer side, and a stepwise portion with a difference in level 304 is on the inner side.

The colored region 154 may accordingly differ in thickness at different positions, as illustrated with thicknesses L1, L2, and L3 in the drawing. As a result, a color density visually perceived may be variable in the three-dimensional object 50 observed from the outside. A portion where the colored region 154 is thinner than the other regions, as illustrated with the thickness L2, may be affected by the inner light-reflective region 152 and may accordingly appear white-tinged. With such differences in level in the colored region 154, light transmission and reflection may suddenly change at positions of the differences in level, and color appearance to the eye may be resultantly affected.

FIG. 2C illustrates an example of differences in level in one cross section the three-dimensional object 50. The three-dimensional object 50 finally shaped has multiple ink layers further formed on and below an ink layer in this cross section. Therefore, differences in level of each ink layer are superimposed in the layer-stacking direction, possible impacts of which may need to be taken into account.

Figure 3A:
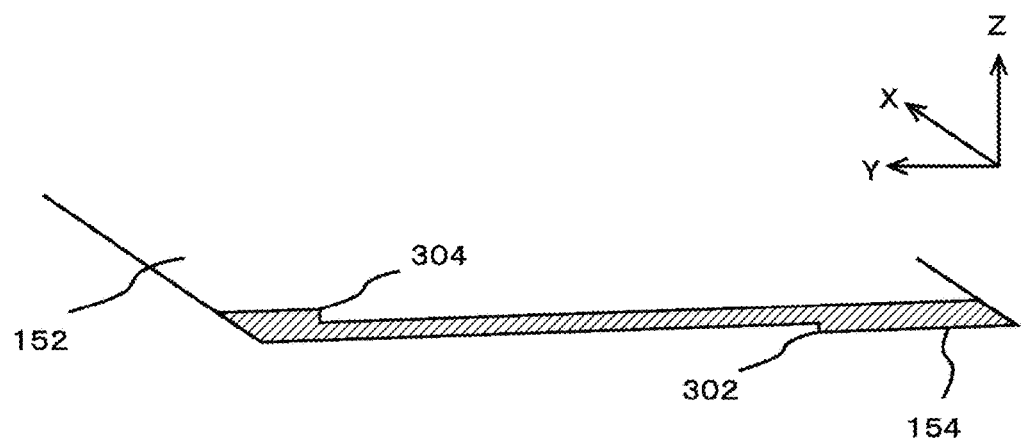
FIGS. 3A and 3B are drawings that illustrate in further detail possible adverse impacts from a plurality of ink layers formed on one another.
Figure 3B:
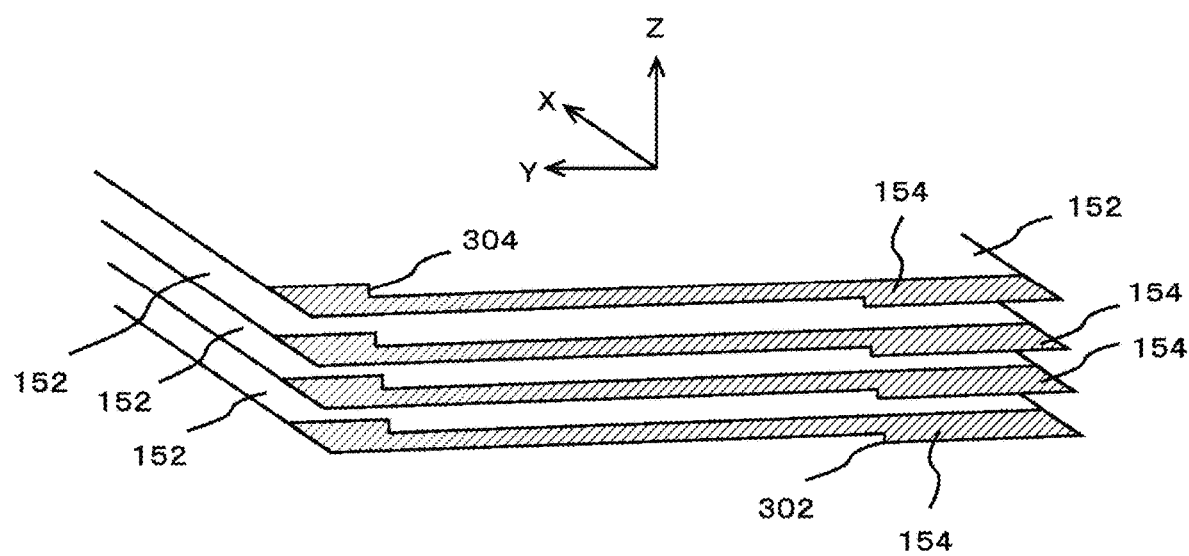

FIGS. 3A and 3B are drawings that illustrate in further detail possible adverse impacts from a plurality of overlapping ink layers. FIG. 3A is a drawing of one ink layer in part, schematically illustrating a portion of the three-dimensional object 50 that is similar or identical to the portion of FIG. 2C, but is illustrated in a different direction to FIG. 2C. FIG. 3B is a schematic drawing of a plurality of ink layers being stacked on one another.

In FIGS. 3A and 3B, the light-reflective region 152 and the colored region 154 are partly schematically illustrated in disregard of actual thicknesses of the ink layers to simplify the illustration. In FIG. 3B, a plurality of ink layers constituting the three-dimensional object 50 are partly illustrated at intervals to simplify the illustration.

In a case where differences in level (differences in level 302 and 304) are present in the colored regions 154 in the respective ink layers, positions of the differences in level may be approximate to one another between the ink layers stacked on one another, as illustrated in the drawings. Specifically, positions of the differences in level may be approximate to one another in a plane orthogonal to the layer-stacking direction. Then, the differences in level may be superimposed in the layer-stacking direction (edges that differ in level are stacked in layers). As a result, such multilayered differences in level may create a region on the side surface of the three-dimensional object 50 where color appearance to the eye differs from the surrounding regions. This region may be visually perceived as a line.

The inventors of the present disclosure have conducted tests to shape the three-dimensional object 50 and have confirmed the possibility of a linear pattern, such as a streak-like pattern or wave-like pattern, being undesirably formed on the surface of the three-dimensional object 50 due to such differences in level. The inventors also have learnt that such an unwanted pattern may affect coloration of the three-dimensional object 50, possibly degrading the three-dimensional object 50 in quality.

In this embodiment, a predetermined color adjustment process is executed at the time of generating the slice data corresponding to at least part of positions in the layer-stacking direction, as described earlier. The color adjustment process according to this embodiment is hereinafter described in further detail. The description starts with an object shaping result obtained based on the slice data subjected to the color adjustment process.

Figure 4A:
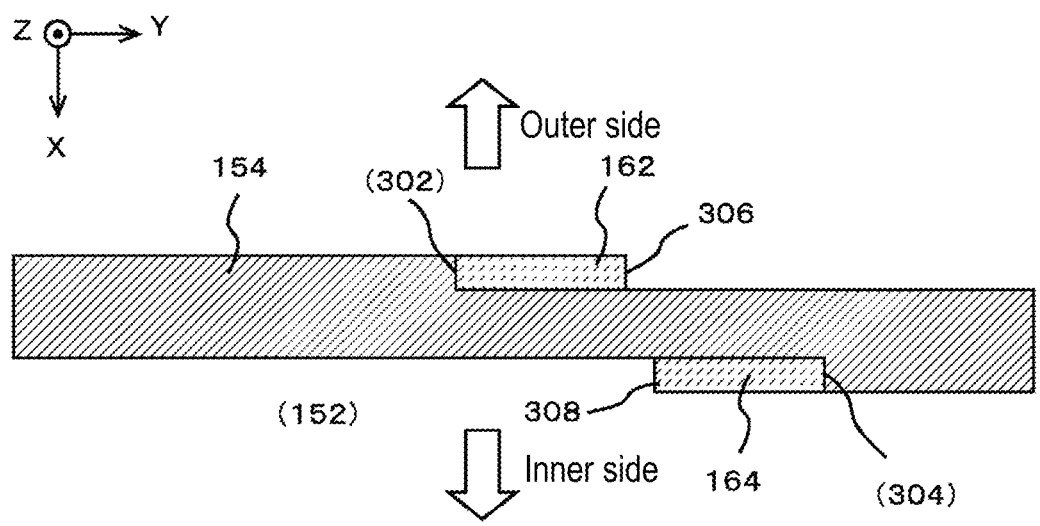
FIGS. 4A to 4C are drawings that illustrate an exemplified object shaping result when slice data subjected to a color adjustment process is used.
Figure 4B:
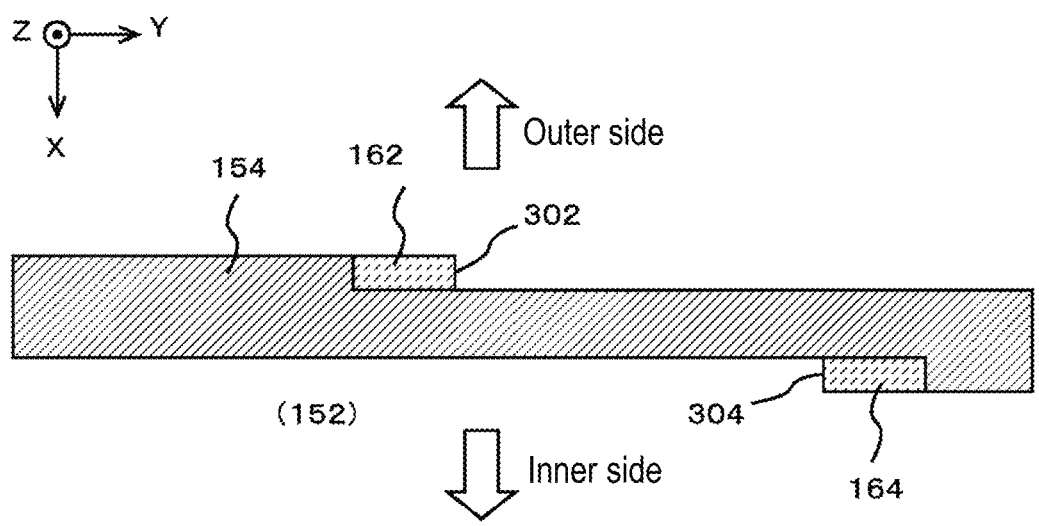
Figure 4C:
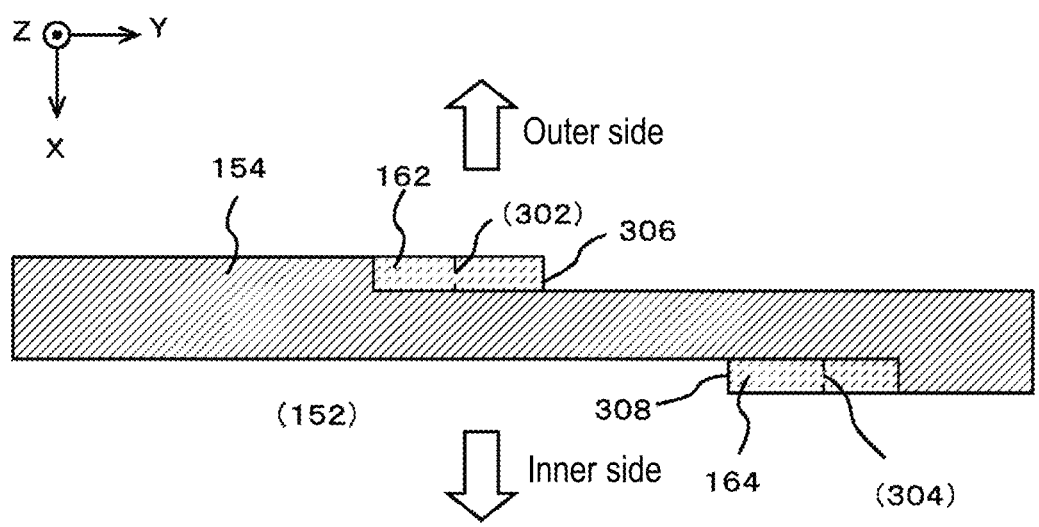

FIGS. 4A to 4C are drawings that illustrate an object shaping result when slice data subjected to the color adjustment process is used. FIG. 4A is a drawing of an object shaping result, schematically illustrating an exemplified portion of the three-dimensional object 50 (see FIGS. 1A to 1C) similar or identical to the portion of FIG. 2C when the slice data is generated with the color adjustment process being executed.

As described earlier, variability of color appearance to the eye may be likely to occur due to differences in level when the color adjustment process is not executed, and such variability may originate from, for example, changes in thickness of the colored region 154 and/or sudden changes of light transmission and reflection at the positions of differences in level. To deal with this issue, this embodiment forms color adjustment regions 162 and 164 for adjustment of color appearance to the eye in the vicinity of differences in level in the colored region 154 so as to moderate variability of color appearance to the eye at positions of the differences in level. Specifically, when the color adjustment process is not executed, the color adjustment region 162 is formed at the position of the difference in level 302 on the outer side than the light-reflective region 152, and the color adjustment region 164 is formed at the position of the difference in level 304 on the inner side than the light-reflective region 152, as illustrated in the drawing. This may moderate variability of color appearance to the eye at the positions of the differences in level 302 and 304.

In this embodiment, the color adjustment regions 162 and 164 are each an example of the region lower in color density than the surrounding region. Specifically describing the region lower in color density than the surrounding region, in a cross section of the three-dimensional object 50, the color adjustment regions 162 and 164 are lower in color density than in portions of the colored region 154 in contact with the color adjustment regions 162 and 164. The color density lower in the color adjustment region 162, 164 means that color density is lower on average in the region.

In a case where differences in level resulting from a resolution set for object shaping are generated on the surface of the three-dimensional object 50 currently shaped by the object shaping apparatus 12 (see FIGS. 1A to 1C), for example, the color adjustment regions 162 and 164 are formed in the vicinity of at least part of the differences in level. The color adjustment regions 162 and 164 may be regarded as regions formed in weaker colors in the vicinity of differences in level on the surface of the three-dimensional object 50. The differences in level on the surface of the three-dimensional object 50 may be differences in level in the colored region 154 constituting the outer surface of the three-dimensional object 50.

In this embodiment, color conditions (color type, color density) for the color adjustment regions 162 and 164 are set during the color adjustment process prompted by the control PC 14 (see FIGS. 1A to 1C). For example, the color density of the color adjustment region 162, 164 may be gradationally changed. In the color adjustment region 162, 164, a color density may be set so that the color of the region is weaker with increasing distance from the portion in contact with the colored region 154.

In the example illustrated in FIG. 4A, the color adjustment region 162 may be formed on the outer side than the colored region 154, specifically, formed at the position of the difference in level 302 on the outer side than the colored region 154 in continuity with the colored region 154. The difference in level 302 on the outer side than the colored region 154 may be a difference in level generated on the outer side than the colored region 154 when the color adjustment process is not executed. Then, the difference in level 302 in the colored region 154 is part of a region where the colored region 154 and the color adjustment region 162 are continuous to each other, instead of the region to be colored of the three-dimensional object 50, as illustrated in the drawing. The region to be colored of the three-dimensional object 50 may be the colored region 154, color adjustment region 162, and color adjustment region 164 that are combined together. Then, the difference in level 306 in the region to be colored on the outer side than the colored region 154 is at one end of the color adjustment region 162 on the opposite side of the difference in level 302.

Similarly, the color adjustment region 164 is formed on the inner side than the colored region 154, specifically, formed at the position of the difference in level 304 on the inner side than the colored region 154 in continuity with the colored region 154. The difference in level 304 on the inner side than the colored region 154 may be a difference in level generated on the inner side than the colored region 154 when the color adjustment process is not executed. Then, the difference in level 304 in the colored region 154 is part of a region where the colored region 154 and the color adjustment region 164 are continuous to each other, instead of the region to be colored of the three-dimensional object 50, as illustrated in the drawing. Then, a difference in level 308 in the region to be colored closer to the light-reflective region 152 is at one end of the color adjustment region 164 on the opposite side than the difference in level 304.

As described earlier, a color density may be gradationally changed in the color adjustment region 162, 164, so that the color density is lower than at portions in the vicinity of the differences in level 302 and 304 in the colored region 154. For example, color conditions for the color adjustment region 162 may be set, so that color density decreases in phases, from the difference in level 302 in the colored region 154 where the colored region 154 is in contact with one end of the color adjustment region 164 toward the difference in level 306 on the other end side of the color adjustment region 162. For example, color conditions for the color adjustment region 164 may be set, so that color density decreases in phases, from the difference in level 304 in the colored region 154 where the colored region 154 is in contact with one end of the color adjustment region 164 toward the difference in level 308 on the other end side of the color adjustment region 164.

This may moderate variability of color appearance to the eye along the outer surface shape of the three-dimensional object 50, as compared with the three-dimensional object 50 not provided with the color adjustment region 162, 164. As a result, color density is lower in the color adjustment region 162 at the position of the difference in level 306 than in the colored region 154 at the position of the difference in level 302, and color density is lower in the color adjustment region 164 at the position of the difference in level 308 than in the colored region 154 at the position of the difference in level 304. This may adequately suppress variability of color appearance to the eye resulting from possible differences in level generated on the surface of the three-dimensional object 50. This embodiment may thus allow color appearance to the eye to be adequately adjusted in the three-dimensional object 50. Further, the operation to shape the three-dimensional object 50 may be more suitably performed, and the three-dimensional object 50 with a higher quality may be accordingly obtained.

In the illustrated example of FIG. 4A, the color adjustment regions 162 and 164 are provided in a portion where the colored region 154 is not formed in a case where the color adjustment process is not executed. In a modified embodiment of how to form the color adjustment regions 162 and 164, the color adjustment regions 162 and 164, at least in part, may possibly be formed in a portion where the colored region 154 is formed in a case where the color adjustment process is not executed.

FIGS. 4B and 4C are drawings that illustrate manners of forming color adjustment regions 162 and 164 according to modified embodiments. Except for the aspects described below, any portions illustrated with the same reference signs as in FIGS. 4B and 4C as in FIG. 4A may be identical or similar to those illustrated in FIG. 4A.

In the modified embodiment illustrated in FIG. 4B, the color adjustment regions 162 and 164 in whole are provided in a portion where the colored region 154 is formed in a case where the color adjustment process is not executed. In this instance, when the color adjustment process is executed, the colored region 154 is accordingly reduced in area correspondingly to the color adjustment regions 162 and 164, and the color adjustment regions 162 and 164 are formed in a space available by the area reduction. When the color adjustment process is not executed, the difference in level 302 in the colored region 154 is accordingly a difference in level in the region to be colored on the outer side than the colored region 154. When the color adjustment process is not executed, the difference in level 304 in the colored region 154 is accordingly a difference in level in the region to be colored at a position closer to the light-reflective region 152.

In the modified embodiment illustrated in FIG. 4C, the color adjustment regions 162 and 164 are partly provided in a portion where the colored region 154 is formed in a case where the color adjustment process is not executed. In this instance, when the color adjustment process is executed, the colored region 154 is accordingly reduced in area correspondingly to part of the color adjustment regions 162 and 164, and the color adjustment regions 162 and 164 are formed so as to partly overlap a space available by the area reduction. As illustrated in the drawing, positions of the differences in level 302 and 304 in the colored region 154 when the color adjustment process is not executed are included in the color adjustment regions 162 and 164. Then, the difference in level 306 on one end side of the color adjustment region 162 is a difference in level in the region to be colored on the outer side than the colored region 154. Further, the difference in level 308 on one end side of the color adjustment region 164 is a difference in level in the region to be colored at a position closer to the light-reflective region 152.

The color adjustment regions 162 and 164 thus formed may also allow color appearance to the eye to be appropriately adjusted in the three-dimensional object 50, as in the example described referring to FIG. 4A. Further, the operation to shape the three-dimensional object 50 may be more suitably performed, and the three-dimensional object 50 with a higher quality may be accordingly obtained.

How to form the color adjustment regions 162 and 164 are not necessarily limited to the examples described so far and may be modified otherwise. To simplify the description, the color adjustment regions 162 and 164 have been so far illustrated and described as regions separate from the colored region 154. Optionally, the slice data may be generated by the control PC 14 without clear distinction between the colored region 154 and the color adjustment regions 162 and 164. In this instance, the slice data generated without the color adjustment process being executed and the slice data generated with the color adjustment process being executed may be compared to each other to identify an identical portion between these data, and the identified portion may be determined as the colored region 154. Any part of the slice data subjected to the color adjustment process that differs from the slice data not subjected to the color adjustment process may be considered as the color adjustment regions 162 and 164. Depending on how to define these regions, the color adjustment regions 162 and 164 may be considered to constitute part of the colored region 154.

Figure 5:
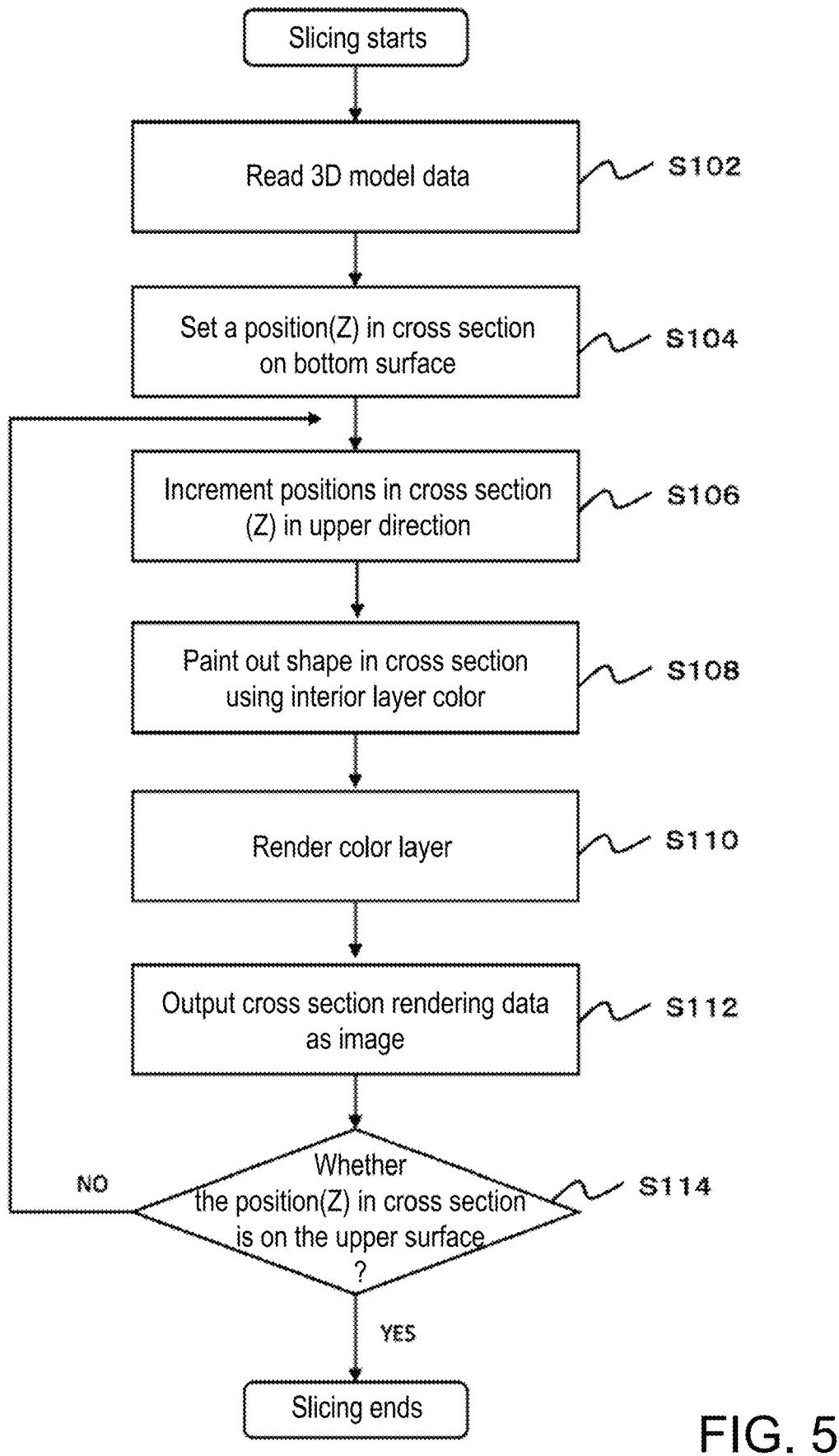
FIG. 5 is an exemplified flow chart of steps in an operation to generate slice data by a control PC 14.
Figure 6A:
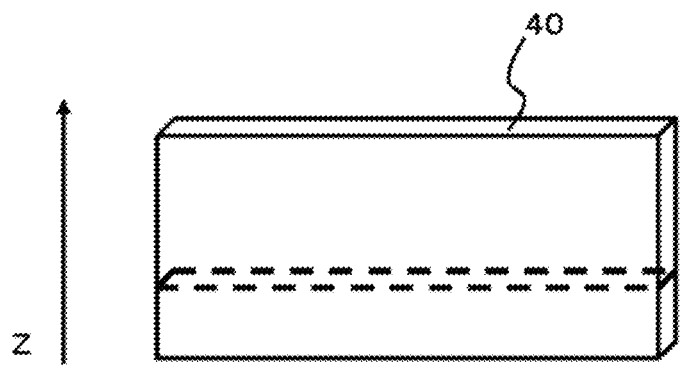
FIGS. 6A to 6C are drawings that illustrate the operation to generate slice data, in which FIGS. 6A to 6C schematically illustrate some of the steps in the flow chart.
Figure 6B:
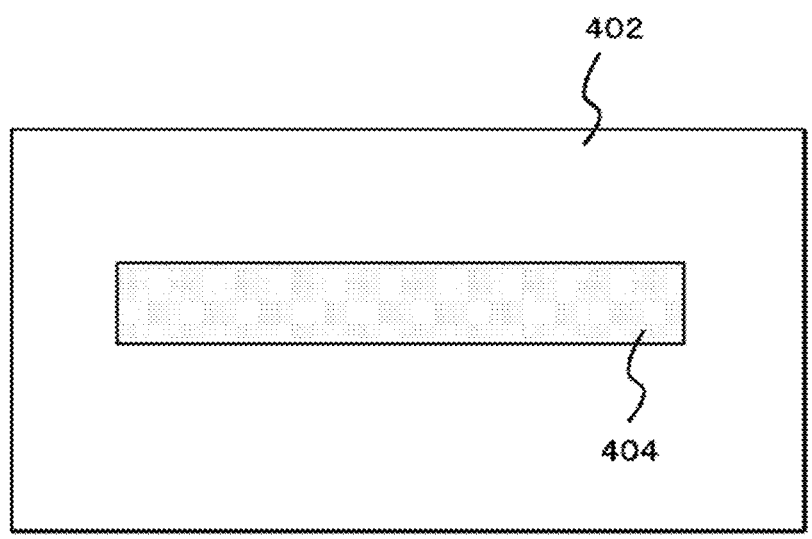
Figure 6C:
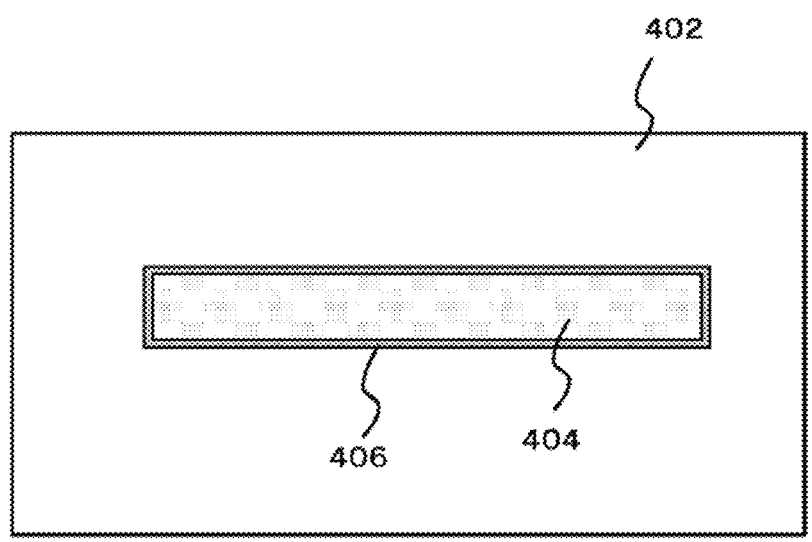

The color adjustment process according to this embodiment is hereinafter described in further detail. The description starts with the operation to generate the slice data by the control PC 14. FIGS. 5 and 6A to 6C are drawings that illustrate an operation to generate the slice data. FIG. 5 is a flow chart of steps in the operation to generate the slice data by the control PC 14. FIGS. 6A to 6C are schematic drawings that schematically illustrate some of the steps in the flow chart.

In this embodiment, the control PC 14 generates the slice data based on the three-dimensional object data representing a three-dimensional object to be shaped by the object shaping apparatus 12 (see FIGS. 1A to 1C), as described earlier. In this operation, the control PC 14, first, reads the three-dimensional object data (S102). The control PC 14 receives the three-dimensional object data from an external source through a network or from storage medium and reads the received three-dimensional object data. The operation to read the three-dimensional object data may be input of the three-dimensional object data to the control PC 14.

Subsequently to the read of the three-dimensional object data, the control PC 14 sets an initial value for positions in cross section that are positions of pieces of slice data to be generated (S104). Specifically, the control PC 14 sets the initial value initial value for positions in cross section to a position on the bottom surface in the three-dimensional object data in the layer-stacking direction (Z direction). After the initial value is set, the control PC 14 generates pieces of slice data at different positions in the layer-stacking direction. At the time of generating pieces of slice data at different positions in the layer-stacking direction, the positions in cross section are incremented upward by a slice data interval previously set (S106), and positions for generating the slice data are set, as illustrated with a broken line in object-shaping data 40 in FIG. 6A.

The control PC 14 obtains a shape of the three-dimensional object at each of the set positions in cross section from the object-shaping data so as to set a shape represented by the slice data at the position in cross section. The region inside the shape is painted out in a predetermined interior layer color (interior color) (S108). The interior layer color may be a color that designates ink used to form the interior of the three-dimensional object. Specifically, in this embodiment, the interior layer color is a color that designates the white color ink used to form the light-reflective region 152 (see FIGS. 2A to 2C).

The color that designates the white color ink may be a preset color that designates use of the white color ink for object shaping. The color that designates the white color ink may be any color but the white color. Specifically, in this embodiment, the white color may be used as background color in the color adjustment process described later in detail. During the stage of generating the slice data, any color but the white color may be used to designate the white color ink. Specifically, in this embodiment, the color that designates the white color ink may be, for example, a red color. In this instance, a portion colored in red during the stage of generating the slice data will be formed with the white color ink in the object-shaping operation by the object shaping apparatus 12. Then, an interior 404 of the three-dimensional object painted in the interior layer color (for example, red) is rendered in a background 402 painted in a predetermined background color, as illustrated in FIG. 6B. The region painted in the background color is handled as not a target region for object shaping. In this embodiment, the background color is a white color.

After the whole shape in cross section of the three-dimensional object is painted out in the interior layer color, the control PC 14 starts a color layer rendering operation (S110). In this instance, the color layer is a region that corresponds to the colored region 154 of the three-dimensional object (see FIGS. 2A to 2C). Colors that designate colors used at different positions in the colored region 154 are set at different positions in the color layer. For example, the color layer rendering operation is prompted by setting a colored portion 406 representing the color layer so as to surround the interior 404 of the three-dimensional object, as illustrated in FIG. 6C. Specifically, by setting the colored portion 406 so as to overlap part of the interior 404 of the three-dimensional object illustrated in FIG. 6B, the range of the interior 404 of the three-dimensional object illustrated in FIG. 6B is reduced inward from the outer peripheral side, and the colored portion 406 is set around the interior 404 of the three-dimensional object.

As described in later in further detail, the color adjustment process may be executed, as instructed by a user, in the color layer rendering operation. If necessary, the color layer rendering operation may start upon completion of the color adjustment process.

After the color layer rendering operation is over, the control PC 14 outputs data of a rendering result (cross section rendering data) as an image (S112). The outputted image is then set in the slice data corresponding to the set position in cross section. In this manner, the slice data corresponding to the set position in cross section may be appropriately generated.

The control PC 14 checks whether the position in cross section for which the slice data is previously generated is a position on the upper surface of the three-dimensional object (S114). When the control PC 14 determines that the position is a position on the upper surface (Yes in S114), the operation to generate the slice data is completed. The control PC 14, when determining that the position is not a position on the upper surface (No in S114), returns to S106 and repeats Step S106 and the subsequent steps to generate the slice data corresponding to a next position in cross section.

According to this embodiment, the object-shaping data may be suitably converted into the slice data by sequentially clipping the object-shaping data from lower positions to higher positions in the layer-stacking direction and outputting an image representing a cross section at each position as the slice data. Thus, pieces of slice data representing a three-dimensional object to be desirably shaped may be appropriately generated. In this instance, the control PC 14 may generate the slice data associated with a respective one of the layers formed in the object-shaping operation by the object shaping apparatus 12. By thus generating the slice data, the operation to shape the three-dimensional object by the object shaping apparatus 12 may be appropriately controlled.

To simply the description, part of the operation to generate the slice data is briefly described. To generate the slice data in practical use, any conventional process(es) appropriate for generating the slice data may be executed in addition to the steps described so far. Such additional processes, other than the steps described so far, may include a separation process to separate the slice data in accordance with inks used to shape the object, and a half-tone process (for example, binarizing process) for the slice data separated. The separation process and/or half-tone process may be additionally executed subsequent to Step S114 or between Steps S112 and S114. The separation process and/or half-tone process may be executed by the object shaping apparatus 12, instead of the control PC 14.

Step S110 (color layer rendering), including the color adjustment process in this embodiment, is hereinafter described in further detail. In this embodiment, the slice data represents shapes in cross section of the three-dimensional object at a resolution corresponding to a resolution set for object shaping in the object shaping apparatus 12, as described earlier. Possibly, differences in level may be generated on the contour of a shape represented by the slice data by displaying the shape at a resolution corresponding to the object-shaping resolution. The contour of a shape represented by the slice data may be the contour of the outer surface of the three-dimensional object. Such differences in level may adversely affect color appearance to the eye when the three-dimensional object is observed.

In this embodiment, the color adjustment process is executed, as needed, so as to suppress variability of color appearance to the eye in the vicinity of such differences in level, if any. The color adjustment process may be regarded as a process for moderating variability of color appearance to the eye along the outer surface shape of the three-dimensional object shaped by the object shaping apparatus 12. The color adjustment process changes the condition in the vicinity of positions corresponding to at least part of differences in level so as to moderate variability of color appearance to the eye at positions of the differences in level. Changing the condition in the vicinity of positions corresponding to differences in level may mean, as described earlier, adjusting the slice data in a manner that the color adjustment regions 162 and 164 (see FIGS. 4A to 4C) are formed in the vicinity of positions corresponding to differences in level.

A specific example of the color adjustment process in this embodiment is a process to which an anti-aliasing process employed to draw straight lines on a two-dimensional image is applied for smoothing of the slice data, so that variability of color appearance to the eye in the vicinity of differences in level is moderated. An example of the process to which an anti-aliasing process is applied is a process identical or similar to the known anti-aliasing processes, which is executed for outer and inner peripheral parts of the colored portion 406 (see FIGS. 6A to 6C) in cross section represented by the slice data.

The outer peripheral part of the colored portion 406 may be an edge part of the colored portion 406 on its outer side. The outer side of the colored portion 406 is a side of the colored portion 406 distant from the interior 404 of the three-dimensional object (see FIGS. 6A to 6C). Executing a process identical or similar to the known anti-aliasing processes for the outer peripheral part of the colored portion 406 may specifically mean executing a process identical or similar to the known anti-aliasing processes supposing that a linear region constituting the outer peripheral part of the colored portion 406 is rendered on the background 402 (see FIGS. 6A to 6C) having a determined color. The inner peripheral part of the colored portion 406 may be an edge part of the colored portion 406 on its inner side. The inner side of the colored portion 406 is a side of the colored portion 406 closer to the interior 404 of the three-dimensional object. Executing a process identical or similar to the known anti-aliasing processes for the inner peripheral part of the colored portion 406 may specifically mean executing a process identical or similar to the known anti-aliasing processes supposing that a linear region constituting the inner peripheral part of the colored portion 406 is rendered on a region having the color of the interior 404 of the three-dimensional object.

Hereinafter, to simplify the description, a process identical or similar to the known anti-aliasing processes is simply referred to as an anti-aliasing process. As described in further detail, the anti-aliasing process may be defined as a process for diminishing linear streaks undesirably generated on the surface of the three-dimensional object. Such a process may be executed as described below referring to FIGS. 7 to 9.

Figure 7:
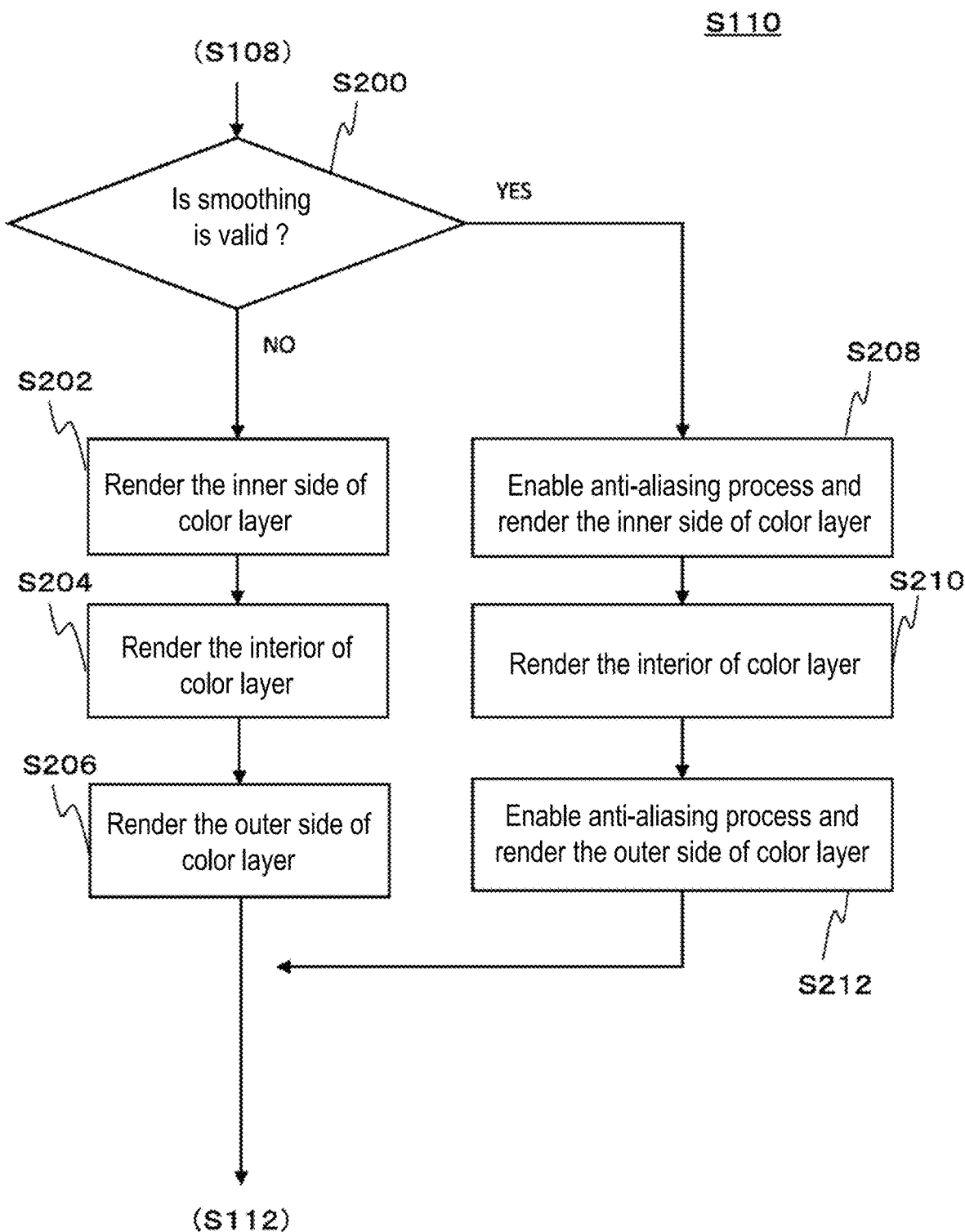
FIG. 7 is an exemplified flow chart of steps of a color layer rendering operation illustrated in detail.

FIGS. 7 to 9C are drawings that illustrate in further detail the color layer rendering operation. FIG. 7 is a flow chart of steps in the color layer rendering operation of Step S110 in FIG. 5 illustrated in detail. FIGS. 8A to 8C and 9A to 9C are schematic drawings that schematically illustrate some of the steps illustrated in the flow chart of FIG. 7.

The color layer rendering operation in Step S110 described earlier referring to FIG. 5 starts with determining whether the smoothing is valid (S200). The smoothing being valid means that the color adjustment process is set to be activated. In Step S200, whether the smoothing is valid may be determined based on an instruction from a user. In this instance, Step S200 may be the instruction receiving stage to receive from the user an instruction to execute the color adjustment process or an instruction not to execute the color adjustment process. Whether to execute the color adjustment process may be automatically set, without receiving the instruction from a user, based on the shape of the three-dimensional object according to the three-dimensional object data.

Figure 8A:
FIGS. 8A to 8C are drawings that illustrate in further detail the color layer rendering operation, in which FIGS. 8A to 8C schematically illustrate some of the steps in the flow chart of FIG. 7.
Figure 8B:
Figure 8C:

When it is determined in Step S200 that the smoothing is invalid (no smoothing) from, for example, the received instruction not to execute the color adjustment process from a user (No in S200), the control PC 14 generates the slice data without the color adjustment process being executed. In this instance, the control PC 14, when rendering the colored portion 406 in the slice data, divides the colored portion 406 into inner, middle, and outer parts and renders these parts separately in three stages. First, the control PC 14 renders the inner part of the colored portion 406 (inner side of the color layer), as illustrated in FIG. 8A (S202). Next, the control PC 14 renders the middle part of the colored portion 406 (interior of the color layer), as illustrated in FIG. 8B (S204). Then, the control PC 14 renders the outer part of the colored portion 406 (outer side of the color layer), as illustrated in FIG. 8C (S206). In this manner, the colored portion 406 in the slice data may be appropriately rendered.

Steps S202 to S206 may be carried out in a manner identical or similar to rendering of the colored portion 406 in the conventional operations to generate slice data. In these steps, the interior 404 of the three-dimensional object rendered earlier is overwritten by the colored portion 406 rendered later. Steps S202 to S206 may be steps of rendering the colored portion 406 from the inner side toward the outer side by reducing the interior 404 of the three-dimensional object that makes up a region corresponding to the shape of the three-dimensional object.

Figure 9A:
FIGS. 9A to 9C are drawings that illustrate in further detail the color layer rendering operation, in which FIGS. 9A to 9C schematically illustrate some of the steps in the flow chart of FIG. 7.

When it is determined in Step S200 that the smoothing is valid (smoothing is to be executed) from, for example, the received instruction to execute the color adjustment process from a user (Yes in S200), the control PC 14 generates the slice data with the color adjustment process being executed. Then, the control PC 14, when rendering the colored portion 406 in the slice data, similarly renders the inner, middle, and outer parts of the colored portion 406 separately in three stages. First, the control PC 14 renders the inner part of the colored portion 406 (inner side of the color layer) with the anti-aliasing process being set valid (S208). Setting the anti-aliasing process valid may mean that a process identical or similar to the conventional anti-aliasing processes is executed after any necessary changes are made in accordance with features of the slice data as in the steps described so far. In Step S208, the inner part of the colored portion 406 is accordingly rendered as illustrated in FIG. 9A in a manner that differs from the example illustrated in FIG. 8A. By thus setting the anti-aliasing process valid, a gradationally colored region is rendered as part of the inner part of the colored portion 406 by mixing (blending) the colors of the colored portion 406 and of the interior 404 of the three-dimensional object.

Figure 9B:

Next, the control PC 14 renders the middle part of the colored portion 406 (interior of the color layer), as illustrated in FIG. 9B (S210). In this embodiment, the middle part is rendered without the anti-aliasing process being set valid, because the middle part that does not constitute any interface associated with the colored portion 406 is unlikely to affect color appearance to the eye with or without the anti-aliasing process being executed. The part rendered in Step S110 may be the same part as rendered in Step S204 in which the smoothing is invalid.

Figure 9C:
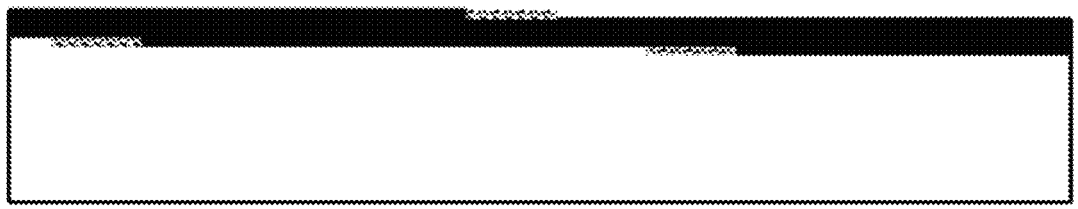

Subsequently to Step S110, the control PC 14 renders the outer part of the colored portion 406 (outer side of the color layer) with the anti-aliasing process being set valid (S212). The outer part is accordingly rendered as illustrated in FIG. 9C in a manner that differs from the example illustrated in FIG. 8C. By thus setting the anti-aliasing process valid, a gradationally colored portion is rendered as part of the outer part of the colored portion 406 by mixing the colors of the colored portion 406 and of the background 402.

The color of the background 402 may be the same as the color of the interior 404 of the three-dimensional object. The outer part of the colored portion 406 may be a gradationally colored portion formed by mixing the colors of the colored port 406 and of the interior 404 of the three-dimensional object.

By thus executing the anti-aliasing process at the time of rendering the inner and outer parts of the colored portion 406, regions corresponding to the color adjustment regions 162 and 164 illustrated in FIGS. 4A to 4C may be automatically and suitably set, and the slice data may be thereby suitably generated in a manner that variability of color appearance to the eye is moderated along the outer surface shape of the three-dimensional object. Variability of color appearance to the eye being moderated along the outer surface shape of the three-dimensional object means that, by generating the slice data with the color adjustment process being executed, variability of color appearance to the eye is moderated along the outer surface shape of the three-dimensional object as compared to the slice data generated without the color adjustment process being executed. Generating the slice data without the color adjustment process being executed means generating the slice data with the smoothing being set invalid.

Steps S208 to S212 may be regarded as steps of rendering the colored portion 406 in combination with the smoothing process. Similarly to Steps S202 to S206, Steps S208 to S212 may be steps of rendering the colored portion 406 from the inner side toward the outer side by reducing the interior 404 of the three-dimensional object that makes up a region corresponding to the shape of the three-dimensional object. Steps S208 to S212 of rendering the colored portion 406 may be regarded as steps of a forming a gradationally colored region in the boundary of the colored portion 406 using mixed (blended) colors of the colored portion 406 and of the interior 404 or the background 402. By executing the anti-aliasing process at the time of generating the slice data to render the colored portion 406 and the interior 404 of the three-dimensional object, colors of which are to be blended, the colors of these portions may be suitably mixed. In this embodiment, the smoothing may be set valid as needed upon receiving an instruction from a user, so that the color adjustment process is executed. As a result, a three-dimensional object with a quality that satisfies the user's needs may be more suitably shaped and obtained.

In view of a relationship between the slice data and the three-dimensional object actually shaped by the object shaping apparatus 12, the inner, middle, and outer parts of the colored portion 406 in the slice data may be regarded as portions corresponding to the inner, middle, and outer regions of the colored region 154 in the three-dimensional object (see FIGS. 2A to 2C). The inner region of the colored region 154 may be a region including an interface between the colored region 154 and the light-reflective region 152 (see FIGS. 2A to 2C). The middle region may be a region on the outer side than the inner region that does not include an interface on the outer side of the three-dimensional object. The outer region may be a region on the outer side than the middle region that includes an interface of the colored region 154 on its outer side.

In this instance, in the color adjustment process, the colored region 154 may be divided into an inner region, a middle region, and an outer region, and color adjustment may be applied to a respective one of these divided regions. Specifically, the color adjustment process may be configured to apply color adjustment along the outer surface shapes of the inner region and the outer region. By applying color adjustment to both of the inner and outer regions, the color adjustment may result in an improved outcome as compared with color adjustment applied to one of these regions alone. Accordingly, any necessary adjustments may be more appropriately feasible. Adjustments may be made in different manners respectively for the inner region and the outer region. Possibly, the color adjustment process for the inner and outer regions may be configured such that color density is higher in the color adjustment region 162 formed on the outer side than the colored region (see FIGS. 4A to 4C) than in the color adjustment region 164 formed on the inner side than the colored region (see FIGS. 4A to 4C). The color adjustment thus configured may allow the three-dimensional object to appear more natural. In a modified embodiment of the color adjustment process, this process may be executed for one of the inner and outer regions alone, instead of both of these regions, in accordance with a desired quality of the object. The color adjustment may be applied to the outer region alone or the inner region alone. In a broader concept, the color adjustment process may be considered to apply color adjustment along the outer surface shape of at least one of the inner region and the outer region in the colored region 154.

Figure 10A:
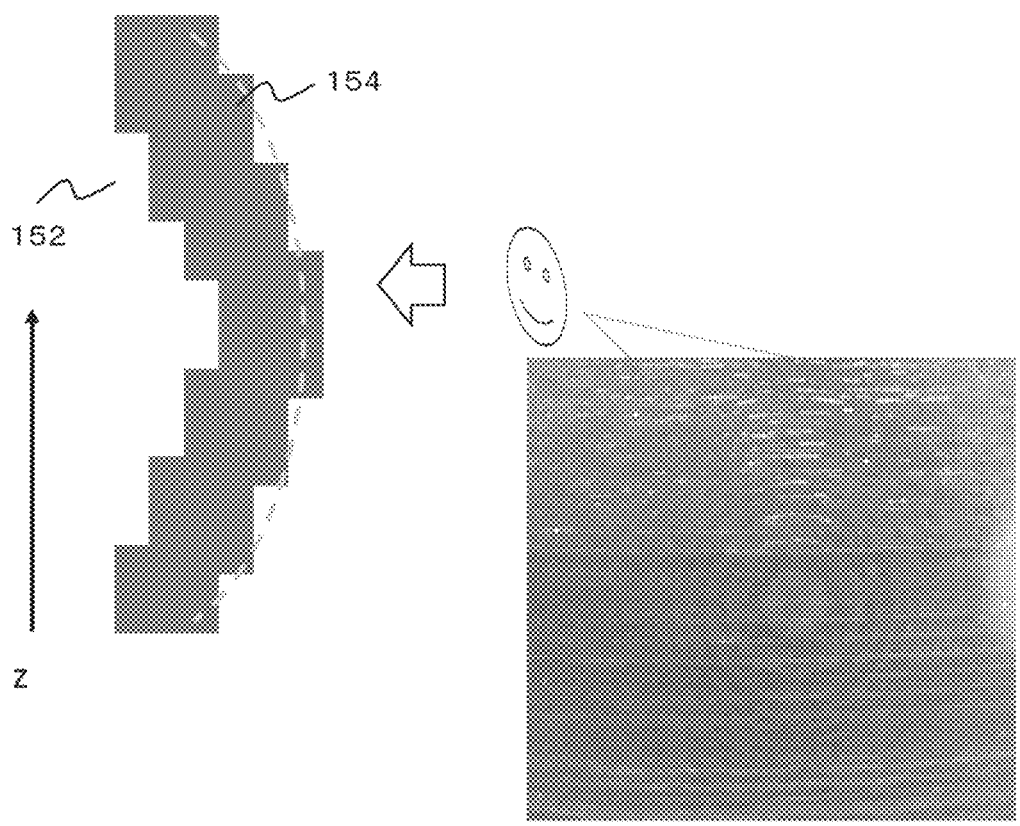
FIGS. 10A and 10B are drawings that illustrate effects attainable by a color adjustment process.
Figure 10B:
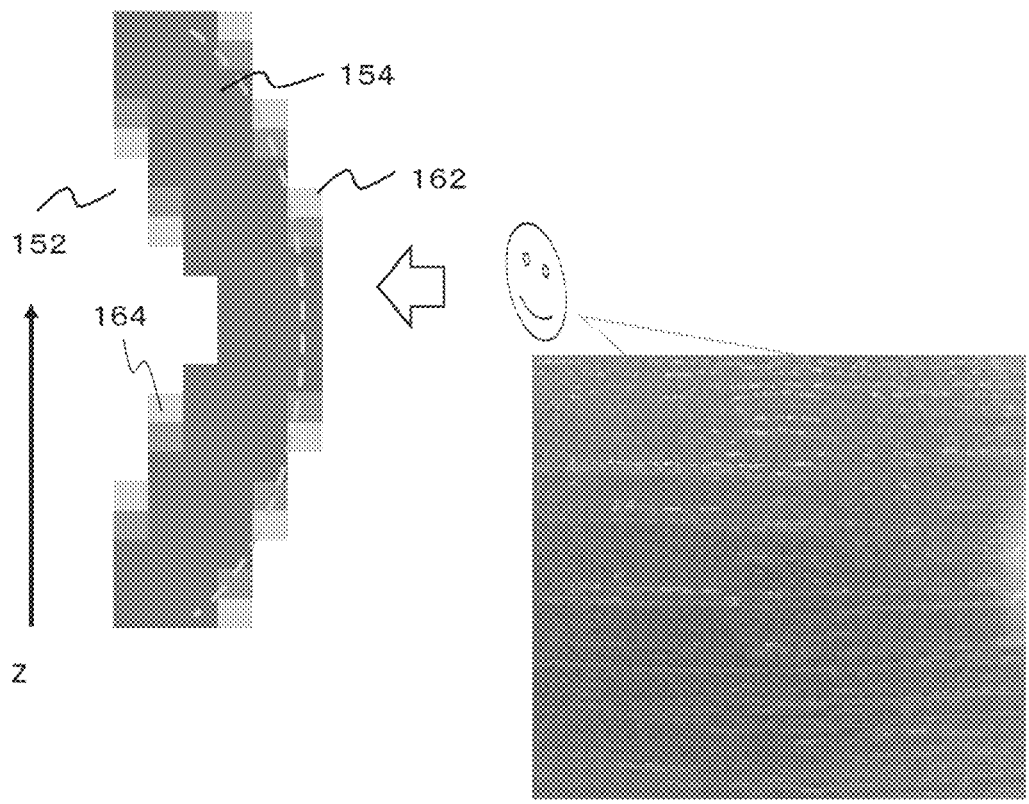

Next, effects attainable by the color adjustment process thus configured are hereinafter described in further detail referring to specific examples. FIGS. 10A and 10B are drawings that illustrate effects attainable by the color adjustment process. FIG. 10A is a drawing of an object-shaping result without the anti-aliasing process being executed (no smoothing), which is a result obtained by using three-dimensional object data representing a nearly spherical three-dimensional object. In FIG. 10A, a part of the three-dimensional object in cross section is schematically illustrated on the left side. On the right side of this drawing is a photograph of the surface in part of a three-dimensional object actually shaped.

As illustrated in the drawing, a large number of differences in level are generated on the outer surface of the colored region 154 and the surface of the colored region 154 closer to the light-reflective region 152. As described earlier, such differences in level may result in changes in thickness of the colored region 154 and sudden changes of light transmission and reflection at positions of the differences in level. As is known from the photograph, an undesirable streak-like pattern appeared on the three-dimensional object due to variability of color appearance to the eye resulting from the differences in level.

FIG. 10B is a drawing of an object-shaping result with the anti-aliasing process being executed (smoothing), which is a result obtained by using three-dimensional object data representing a three-dimensional object having the same shape as in the result of FIG. 10A. In FIG. 10B, a part of the three-dimensional object in cross section is schematically illustrated on the left side. On the right side of this drawing is a photograph of the surface in part of a three-dimensional object actually shaped.

As illustrated in the drawing, a large number of differences in level are generated on the surface of the three-dimensional object similarly to the example illustrated in FIG. 10A. By executing the anti-aliasing process, however, the color adjustment regions 162 and 164, which are colored regions on the outer side than the light-reflective region 152, are formed in addition to the colored region 154. The color adjustment regions 162 and 164 gradationally colored may adequately suppress adverse impacts from changes in thickness of the colored region 154 and sudden changes of light transmission and reflection at the positions of the differences in level. As a result of the formation of these color adjustment regions, any region colored in the three-dimensional object 50 may be less variable in thickness and may allow any unwanted pattern to be less conspicuous. As is known from the photograph, the occurrence of an unwanted streak-like pattern was adequately suppressed in the three-dimensional object, as compared with the example illustrated in FIG. 10A.

Thus, the anti-aliasing process may adequately prevent that any unwanted streak-like pattern stand out on the surface of the three-dimensional object. Further, the operation to shape the three-dimensional object may be more suitably performed, and the three-dimensional object with a higher quality may be accordingly obtained.

In three-dimensional objects of certain shapes obtained without the anti-aliasing process being executed, such a streak-like pattern may be likely to stand out on their surfaces. The inventors of the present disclosure have found out through various tests that conspicuity of such streaks may be variable with degrees of inclination of planes constituting the surface of the three-dimensional object. More specifically, unwanted linear streaks are found to be more likely to appear on the surfaces of three-dimensional object in which angles of inclination of planes constituting the surfaces of the three-dimensional object are nearly perpendicular or horizontal (planes slightly inclined from a perpendicular or horizontal direction).

Figure 11A:
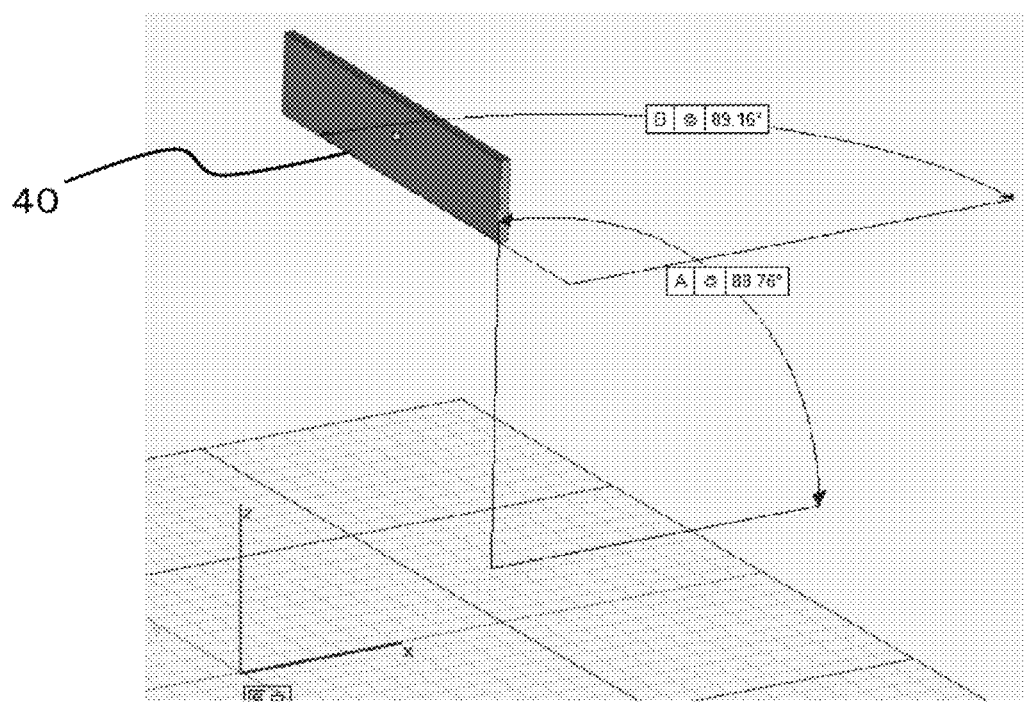
FIGS. 11A and 11B are drawings that illustrate an object shaping result of a three-dimensional object including nearly perpendicular planes.
Figure 11B:
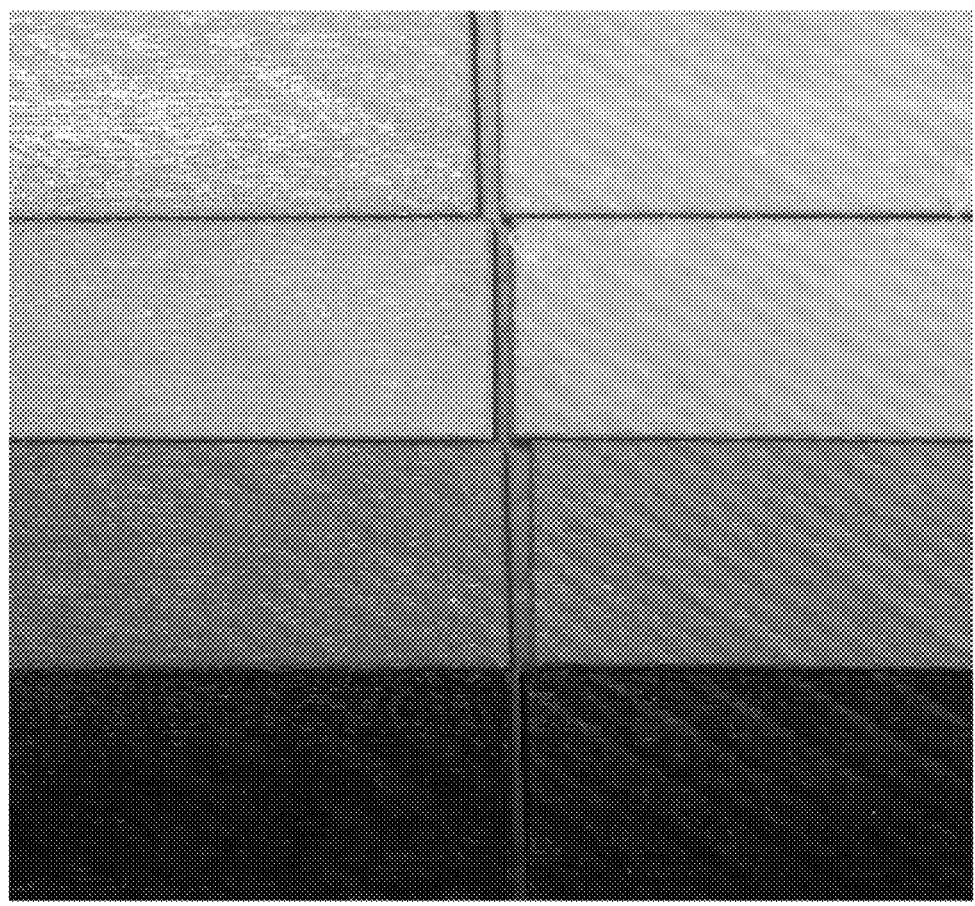

FIGS. 11A and 11B are drawings that illustrate an object shaping result of a three-dimensional object including approximately perpendicular planes. FIG. 11A is a drawing that illustrates angles of planes observed in a three-dimensional object to be shaped and an example of the object-shaping data 40 of the three-dimensional object. FIG. 11B is a photograph showing the object shaping result of the three-dimensional object.

As described earlier, unwanted linear streaks may be likely to appear on the surface of the three-dimensional object in a case where angles of inclination of planes constituting the surface of this object are nearly perpendicular. The inclination of a plane in this instance may be specifically an inclination of the plane relative to a plane orthogonal to the layer-stacking direction. The plane orthogonal to the layer-stacking direction may be a plane parallel to the upper surface (printing surface) of the object-shaping table 104 in the object shaping apparatus 12. The angle of inclination of a plane being nearly perpendicular may mean that an angle of inclination of the plane to a plane orthogonal to the layer-stacking direction is between 85 and 90 degrees. When the angle of inclination is between 88 and 89.9 degrees, linear streaks may be more likely to occur. In this instance, the streaks may be even more likely to occur when the angle made by this plane with the sub scanning direction (X direction) differs, even slightly, from the right angle. Specifically, the streaks may be even more likely to occur when the angle made by this plane with the sub scanning direction is between 85 and 89.9 degrees.

The illustrated example of FIG. 11A shows an object-shaping result when the degree of inclination to a plane orthogonal to the layer-stacking direction is 88.76 degrees and the angle made by this plane with the sub scanning direction is 89.16 degrees in a plate-shaped three-dimensional object having a surface painted out in a color. Various colors were used for the surface color, as illustrated in FIG. 11B. In FIG. 11B, four objects on the right side were not subjected to the anti-aliasing process, whereas four objects on the left side were subjected to the anti-aliasing process.

As is known from the photograph, parts weakened in color (white-tinged parts) periodically appeared on the object not subjected to the anti-aliasing process, which formed an unwanted streak-like pattern. The comparison between results with and without the anti-aliasing process confirmed that the occurrence of a streak-like pattern was adequately controlled by executing the anti-aliasing process.

As described earlier, the unwanted streak-like pattern may also be likely to appear on the surface of the three-dimensional object in a case where angles of inclination of planes constituting the surface of this object are nearly horizontal. The angle of inclination of a plane being nearly horizontal may mean that an angle made by the plane with the layer-stacking direction is approximately 85 to 89.9 degrees. In three-dimensional objects, planes constituting top and bottom surfaces of the three-dimensional object in part may often be nearly horizontally inclined planes.

Figure 12A:
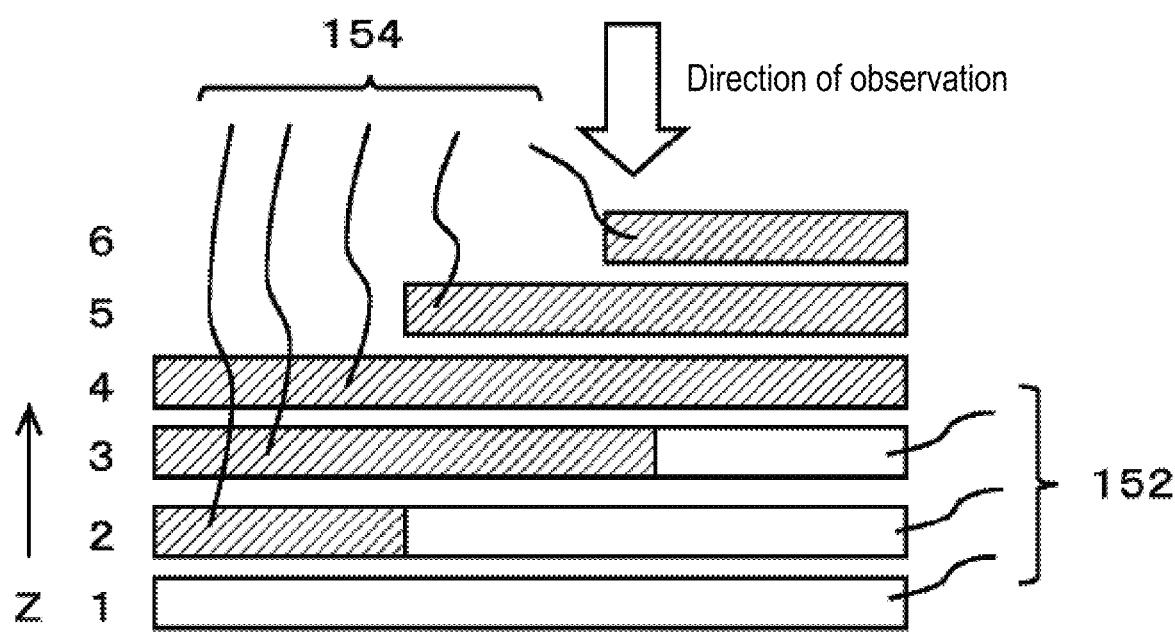
FIGS. 12A and 12B are drawings that illustrate an object shaping result of a three-dimensional object including nearly horizontal planes.
Figure 12B:
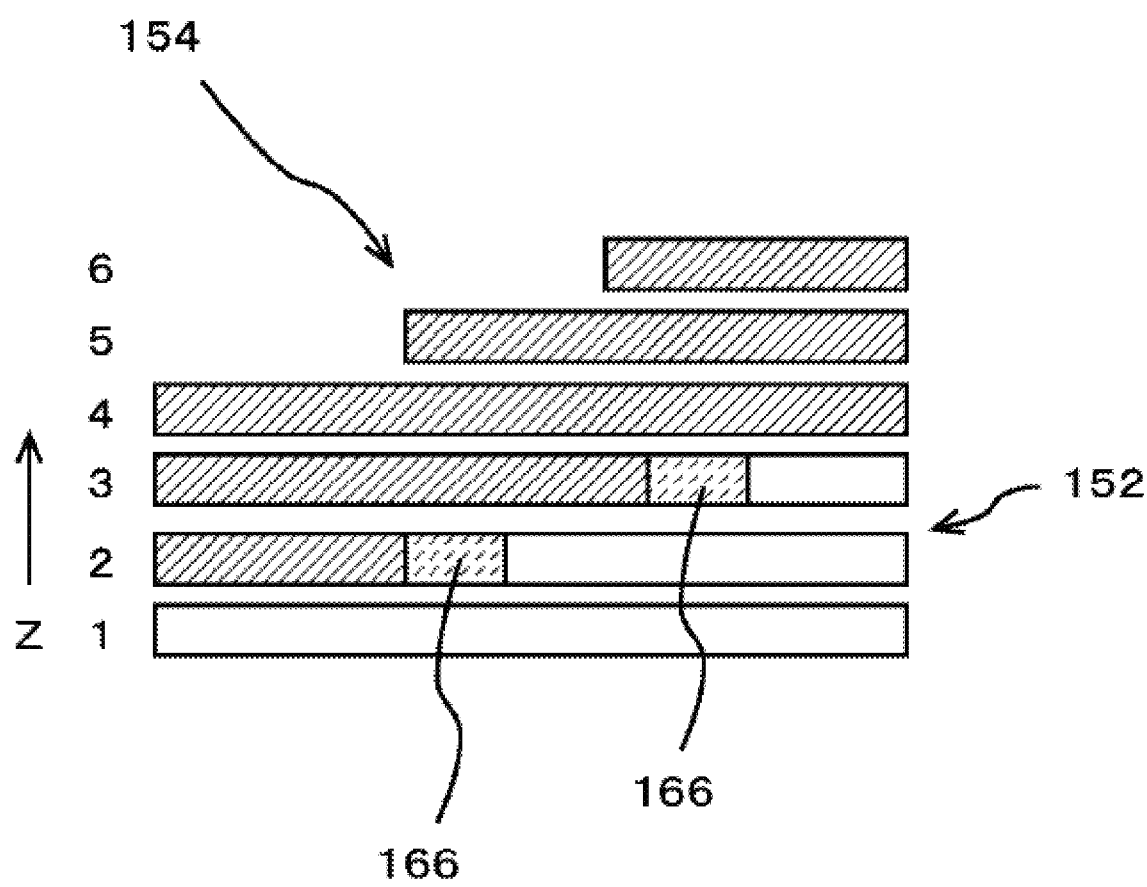

FIGS. 12A and 12B are drawings that illustrate an object shaping result of a three-dimensional object including nearly horizontal planes. FIG. 12A is a drawing that illustrates cross sections of a three-dimensional object shaped without the anti-aliasing process being executed. FIG. 12B is a drawing that illustrates cross sections of a three-dimensional object shaped with the anti-aliasing process being executed.

As illustrated in FIG. 12A, when a three-dimensional object is shaped without the anti-aliasing process being executed, the slice data is generated at intervals set in accordance with, for example, thickness of the colored region 154 constituting the ink layers. In any plane inclined relative to the horizontal direction, a coloring range (rendering range) may be variable at different positions in the colored region 154. When a three-dimensional object is observed from the upper side as in a direction of observation illustrated with an arrow in the drawing, the colored region 154 may differ in thickness at different positions, which may be visually perceived as a line.

When the anti-aliasing process is executed, on the other hand, such a region as the color adjustment region 166 in FIG. 12B additionally formed may help to diminish any adverse impacts from differences in thickness of the colored region and may thereby allow variability of color appearance to the eye to be moderate along the outer surface shape of the three-dimensional object 50. This may also prevent such a disturbing line as described earlier from becoming conspicuous. Accordingly, also in three-dimensional objects including nearly horizontal planes, the anti-aliasing process may allow such three-dimensional objects to improve in quality.

In the example illustrated in FIG. 12B, the color adjustment region 166 alone is formed on the surface of the colored region 154 closer to the light-reflective region 152, with no color adjustment region on the outer side than the colored region 154. In this instance, variability of color appearance to the eye may be adequately suppressed along the outer surface shape of the three-dimensional object 50, as is clear known from the drawing.

Additional remarks are given below in relation to the technical features described thus far. The anti-aliasing process may be executed during the operation to generate the slice data by the control PC 14 (see FIGS. 1A to 1C) as described earlier. The control PC 14 may execute the anti-aliasing process in accordance with a program that prompts the control PC 14 to generate the slice data (for example, 3D slicer application program).

As described earlier, unwanted linear streaks may be more likely to appear on the surface of a three-dimensional object in which angles of inclination of planes constituting the surface of this object are nearly perpendicular or horizontal. However, differences in level on the surface of the three-dimensional object may be generated regardless of any angles of inclination. Such planes constituting top and bottom surfaces may be visually perceived as generally called, layer streaks, and the three-dimensional object may be degraded in quality. However, differences in level, if any, on the surface of the three-dimensional object may be difficult to visually perceive as a result of the anti-aliasing process. The anti-aliasing process described thus far may be considered effective even when angles of inclination of planes are any angles but nearly horizontal or perpendicular. Thus, the anti-aliasing process may be defined as a process ensuring that differences in level on the surface of the three-dimensional object are difficult to visually perceive and allows the object's surface to appear flatter at positions of the differences in level.

In the description given so far, the anti-aliasing process is executed during the operation to generate each piece of slice data. In this manner, the anti-aliasing process may be executed easily and appropriately. In a modified embodiment, the anti-aliasing process may be executed, not for each piece of slice data, but for a plurality of pieces of slice data corresponding to a plurality of continuous positions in cross section in the layer-stacking direction. The anti-aliasing process may be executed in consideration of variability of color appearance to the eye in a direction orthogonal to a cross section according to each piece of slice data.

As described earlier, the object shaping apparatus 12 and the control PC 14 characterized as described so far may be configured otherwise in a manner identical or similar to the known object shaping apparatuses and control PCs. For example, the object shaping apparatus 12 may carry out various operations for stability of ink ejection from the inkjet heads. An example of such operations may be preliminary ink ejection. The preliminary ink ejection may be intended to avoid failure to eject ink by preliminarily ejecting ink at predetermined timings. As described in Japanese Unexamined Patent Publication No. 2016-016568, for example, nozzles may be prevented from drying by ejecting ink to the vicinity of a three-dimensional object currently shaped. Possibly, inks may be ejected from inkjet heads for different colors to a region where layers of ink used to form support layers (material for support layers) are formed.

In a modified embodiment of the preliminary ink ejection, a region for preliminary ink ejection may be set in a region constituting a three-dimensional object currently shaped. In this instance, the region for preliminary ink ejection may be set at a position adequately distant from the surface of the three-dimensional object, so that the color of ink preliminarily ejected and deposited in the three-dimensional object does not affect the outer appearance of the three-dimensional object. More specifically, in a three-dimensional object having its surface colored by forming the light-reflective region and the colored region, for example, the region for preliminary ink ejection may be set on the inner side than a portion of at least the light-reflective region that incident light is reachable. In any three-dimensional object having no colored region formed therein, the region for preliminary ink ejection may be similarly set on the inner side of the three-dimensional object, so that the outer appearance of the three-dimensional object is not affected.

INDUSTRIAL APPLICABILITY

This disclosure may be suitably applicable to object shaping methods for shaping three-dimensional objects.

What is claimed is:

1. An object shaping method for shaping a three-dimensional object, comprising:
a data reading stage of reading a three-dimensional object data representing the three-dimensional object to be shaped by the object shaping method and at least designating a color used for coloration of at least part of a surface of the three-dimensional object;
a slice data generating stage of generating a slice data representing a cross section of the three-dimensional object at each of a plurality of different positions in a layer-stacking direction previously set; and
an object shaping stage of shaping the three-dimensional object in accordance to the slice data generated in the slice data generating stage,
wherein the slice data generating stage comprising:
generating pieces of the slice data representing shapes and colors of the three-dimensional object at the plurality of different positions in the layer-stacking direction based on the three-dimensional object data in a manner that the pieces of the slice data are associated with the plurality of different positions,
wherein the three-dimensional object includes a colored region, formed with a coloring material in a portion of the three-dimensional object where coloration is visually perceivable when observed from an outer side of the three-dimensional object, and the slice data generating stage further comprising:
executing a color adjustment process at a time of generating the slice data associated with at least part of the plurality of different positions in the layer-stacking direction, and the color adjustment process being a process of moderating variability of color appearance to an eye along an outer surface shape of the three-dimensional object shaped in the object shaping stage;
wherein in the slice data generating stage, the slice data is generated that represents the cross section of the three-dimensional object at a resolution corresponding to the resolution set for object shaping in the object shaping stage, and
the color adjustment process adjusts the slice data in a manner that color adjustment regions are formed in a vicinity of positions corresponding to differences in level,
wherein the slice data generated without the color adjustment process being executed and the slice data generated with the color adjustment process being executed are compared to each other, to identify:
an identical portion that is determined as the colored region; and
a different portion that is determined as the color adjustment regions, a color density of the color adjustment regions being lower than a color density of the colored region,
when the differences in level are generated on contour of a shape represented by the slice data by displaying the shape at the resolution corresponding to the resolution set for object shaping, the process of moderating variability of color appearance to the eye is executed as the color adjustment process at positions of at least part of the differences in level;
wherein in the color adjustment process, the slice data is adjusted so that the regions lower in color density than a surrounding region thereof formed in a vicinity of positions is gradationally changed in color density.

2. The object shaping method according to claim 1, further comprising:
an instruction receiving stage of receiving from a user an instruction to execute the color adjustment process or an instruction not to execute the color adjustment process, wherein
when the instruction not to execute the color adjustment process is received from the user in the instruction receiving stage, the slice data is generated without the color adjustment process being executed in the slice data generating stage, and
when the instruction to execute the color adjustment process is received from the user in the instruction receiving stage, the slice data is generated with the color adjustment process being executed in the slice data generating stage.

3. The object shaping method according to claim 2, wherein
when the instruction to execute the color adjustment process is received from the user in the instruction receiving stage, the slice data is generated with the color adjustment process being executed in the slice data generating stage, so that the slice data is generated in a manner that variability of color appearance to the eye is moderated along the outer surface shape of the three-dimensional object as compared with the slice data generated without the color adjustment process being executed.

4. The object shaping method according to claim 1, wherein the three-dimensional object shaped in the object shaping stage comprising:
a light-reflective region, formed with a light-reflective material on an inner side than the colored region, wherein in the color adjustment process, the colored region is divided into:
- an inner region including an interface at a side of the light-reflective region,
- a middle region on an outer side than the inner region that does not include an interface on the outer side of the three-dimensional object, and
- an outer region on an outer side than the middle region that includes an interface on an outer side of the colored region, wherein a color adjustment is applied to the inner region and the outer region along the outer surface shape.

5. The object shaping method according to claim 1, wherein
in the object shaping stage, layers of a material for object shaping are formed with a use of an ejection head that ejects the material for object shaping and then stacked on one another so as to shape the three-dimensional object, and
in the slice data generating stage, the slice data is generated that is associated with a respective one of the layers formed in the object shaping stage.

6. An object shaping system for shaping a three-dimensional object, comprising:
a slice data generating apparatus, configured to read a three-dimensional object data representing the three-dimensional object to be shaped and at least designating a color used for coloration of at least part of a surface of the three-dimensional object and to generate a slice data representing a cross section of the three-dimensional object at each of a plurality of different positions in a layer-stacking direction previously set;
an object shaping apparatus, configured to shape the three-dimensional object in accordance with the slice data generated by the slice data generating apparatus,
wherein the slice data generating apparatus further being configured to generate pieces of the slice data representing shapes and colors of the three-dimensional object at the plurality of different positions in the layer-stacking direction based on the three-dimensional object data in a manner that the pieces of the slice data are associated with the plurality of different positions and to execute a color adjustment process at a time of generating the slice data associated with at least part of the plurality of different positions in the layer-stacking direction,
the color adjustment process being a process of moderating variability of color appearance to an eye along an outer surface shape of the three-dimensional object shaped by the object shaping apparatus;
wherein the slice data generating apparatus is configured to generate the slice data that re presents the cross section of the three-dimensional object at a resolution corresponding to the resolution set for object shaping performed in the object shaping apparatus, wherein the three-dimensional object includes a colored region, formed with a coloring material in a portion of the three-dimensional object where coloration is visually perceivable when observed from an outer side of the three-dimensional object,
the color adjustment process adjusts the slice data in a manner that color adjustment regions are formed in a vicinity of positions corresponding to differences in level, wherein the slice data generated without the color adjustment process being executed and the slice data generated with the color adjustment process being executed are compared to each other, to identify:
an identical portion that is determined as the colored region; and
a different portion that is determined as the color adjustment regions, a color density of the color adjustment regions being lower than a color density of the colored region, and
when the differences in level are generated on contour of a shape represented by the slice data by displaying the shape at the resolution corresponding to the resolution set for object shaping, the process of moderating variability of color appearance to the eye is executed as the color adjustment process at positions of at least part of the differences in level;
wherein in the color adjustment process, the slice data is adjusted so that a region lower in color density than a surrounding region thereof formed in a vicinity of positions is gradationally changed in color density.

* * * * *